(12) United States Patent
Rusanovskyy et al.

(10) Patent No.: US 11,785,219 B2
(45) Date of Patent: Oct. 10, 2023

(54) COEFFICIENT CODING FOR SUPPORT OF DIFFERENT COLOR FORMATS IN VIDEO CODING

(71) Applicant: QUALCOMM Incorporated, San Diego, CA (US)

(72) Inventors: Dmytro Rusanovskyy, San Diego, CA (US); Jianle Chen, San Diego, CA (US); Yan Zhang, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/223,814

(22) Filed: Apr. 6, 2021

(65) Prior Publication Data
US 2021/0321107 A1 Oct. 14, 2021

Related U.S. Application Data

(60) Provisional application No. 63/009,292, filed on Apr. 13, 2020.

(51) Int. Cl.
*H04N 19/13* (2014.01)
*H04N 19/91* (2014.01)
*H04N 19/176* (2014.01)
*H04N 19/186* (2014.01)
*H04N 19/70* (2014.01)

(52) U.S. Cl.
CPC ........... *H04N 19/13* (2014.11); *H04N 19/176* (2014.11); *H04N 19/186* (2014.11); *H04N 19/70* (2014.11); *H04N 19/91* (2014.11)

(58) Field of Classification Search
CPC .... H04N 19/13; H04N 19/176; H04N 19/186; H04N 19/70; H04N 19/91
USPC ...................................................... 375/240.02
See application file for complete search history.

(56) References Cited

U.S. PATENT DOCUMENTS

| | | | |
|---|---|---|---|
| 2012/0230402 A1* | 9/2012 | Auyeung | H04N 19/13 375/E7.243 |
| 2013/0034154 A1* | 2/2013 | Song | H04N 19/109 375/240.03 |
| 2013/0107970 A1 | 5/2013 | Wang et al. | |
| 2013/0114676 A1 | 5/2013 | Guo et al. | |

(Continued)

OTHER PUBLICATIONS

Choi, "Text of ISO/IEC CD 23094-1, Essential Video Coding", Jul. 2019, ISO/IEC JTC1/SC29/WG11 N18568 (Year: 2019).*

(Continued)

*Primary Examiner* — Albert Kir
(74) *Attorney, Agent, or Firm* — QUALCOMM Incorporated; Espartaco Diaz Hidalgo

(57) ABSTRACT

A method of decoding video data comprises determining, based on a color format of a picture of the video data, which context model from among a first context model and a second context model to use to determine a context increment for a syntax element that indicates a prefix of an x or y coordinate of a last significant transform coefficient of a color component of a block of the picture; and decoding a bin of the syntax element by applying Context Adaptive Binary Arithmetic Coding (CABAC) using a context determined based on the context increment for the syntax element.

27 Claims, 13 Drawing Sheets

(56) References Cited

U.S. PATENT DOCUMENTS

| | | | |
|---|---|---|---|
| 2013/0272423 A1* | 10/2013 | Chien | H04N 19/18 375/240.18 |
| 2014/0003488 A1 | 1/2014 | Ji et al. | |
| 2014/0105291 A1* | 4/2014 | Nakamura | H04N 19/593 375/240.12 |
| 2014/0341274 A1 | 11/2014 | Sole Rojals et al. | |
| 2015/0078432 A1* | 3/2015 | Wang | H04N 19/18 375/240.16 |
| 2016/0353113 A1 | 12/2016 | Zhang et al. | |
| 2020/0021855 A1* | 1/2020 | Kuusela | H04N 19/13 |
| 2020/0322640 A1 | 10/2020 | Rusanovskyy et al. | |
| 2021/0274182 A1* | 9/2021 | Leleannec | H04N 19/103 |
| 2022/0046247 A1* | 2/2022 | Yoo | H04N 19/70 |
| 2022/0070459 A1* | 3/2022 | Zhang | H04N 19/157 |
| 2022/0159276 A1* | 5/2022 | Koo | H04N 19/176 |
| 2022/0400277 A1* | 12/2022 | Yoo | H04N 19/46 |

OTHER PUBLICATIONS

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7, 2020-Jan. 17, 2020, Document: JVET-Q2001-vE, No. JVET-Q2001, m52905, Jan. 22, 2020 (Jan. 22, 2020), XP030285390, 515 pages, Retrieved from the Internet: URL: http://phenix.int-evry.fr/jvet/doc_end_user/documents/17_Brussels/wg11/JVET-Q2001-v15.zip JVET-Q2001-vE.docx [retrieved on Mar. 12, 2020].

ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.

International Search Report and Written Opinion—PCT/US2021/026212—ISAEPO—dated Aug. 12, 2021, 15 pp.

Sze V., et al., "Entropy Coding in HEVC," In: "High Efficiency Video Coding (HEVC): Algorithms and Architectures—Chapter 8: Entropy Coding in HEVC," Springer International Publishing, Jan. 1, 2014 (Jan. 1, 2014), pp. 209-274, XP55263413, ISBN: 978-3-319-06894-7, DOI: 10.1007/978-3-319-06895-4_8, Section 8.6.4.2, Section 8.6.4.4, figure 8.21, table 8.9, 8.10.

Choi K., et al., "Text of ISO/IEC DIS 23094-1, Essential Video Coding", International Organisation for Standardisation Organisation Internationale De Normalisation ISO/IEC JTC 1/SC 29/WG 11 Coding of Moving Pictures and Audio, ISO/IEC JTC 1/SC 29/WG 11, N18774, 128th MPEG Meeting, Oct. 7, 2019-Oct. 11, 2019, Geneva, (Motion Picture Expert Group or ISO/IEC JTC1/SC29/WG11), No. N18774, Nov. 6, 2019 (Nov. 6, 2019), XP030225506, 305 Pages, Retrieved from the Internet: URL: http://phenix.int-evry.fr/mpeg/doc_end_user/documents/128_Geneva/wg11/w18774.

* cited by examiner

| Position | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| Coefficients | 0 | 0 | 0 | 0 | 1 | -1 | 0 | 2 | 0 | 3 | 2 | -1 | 0 | 5 | -7 | 10 |
| sigMapFlag | 0 | 0 | 0 | 0 | 1 | 1 | 0 | 1 | 0 | 1 | 1 | 1 | 0 | 1 | 1 | 1 |
| flagLevelA |   |   |   |   | 0 | 0 |   | 1 |   | 1 | X | X |   | X | X | X |
| flagLevelB |   |   |   |   | 0 |   |   | 0 |   | 1 | X |   |   | X | X | X |
| signFlag |   |   |   |   | 0 | 1 |   | 0 |   | 0 | 0 | 1 |   | 0 | 1 | 0 |
| levelRem |   |   |   |   |   | 0 |   |   |   | 0 |   | 0 |   | 4 | 6 | 9 |

FIG. 5

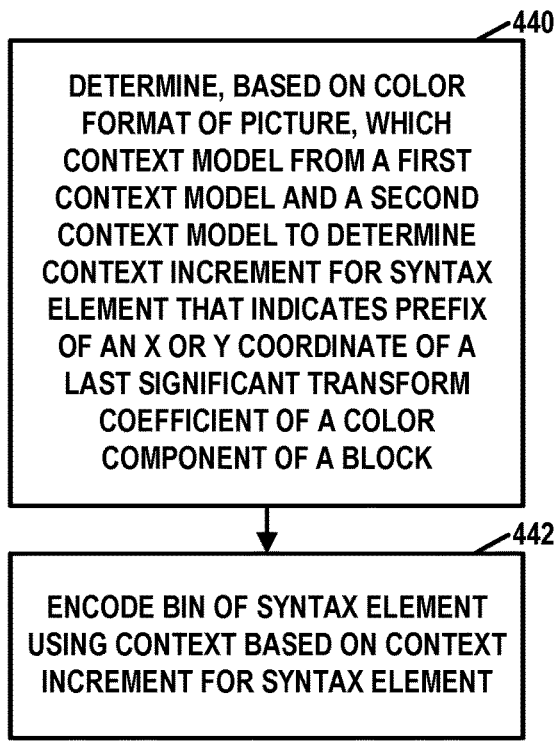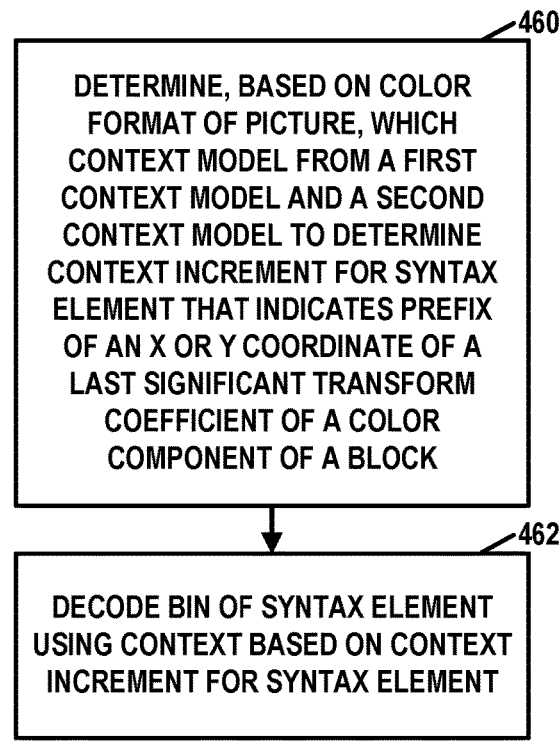
FIG. 11                    FIG. 12

COEFFICIENT CODING FOR SUPPORT OF DIFFERENT COLOR FORMATS IN VIDEO CODING

This application claims the benefit of U.S. Provisional Patent Application 63/009,292, filed Apr. 13, 2020, the entire content of which is incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for transform coefficient coding and enabling coding of video data with different color formats, e.g., 4:2:2 and 4:4:4 in addition to 4:2:0. As described herein, Essential Video Coding Test Model 5.0 (ETM 5.0) uses a context derivation process to determine contexts for context-adaptive binary arithmetic coding (CABAC) of syntax elements indicating prefixes of x and y coordinates of a last significant transform coefficient of a block. A context specifies probabilities of symbols. The context derivation process of ETM 5.0 does not take into account the different color formats. This may lead to selection of contexts with less accurate probabilities. This disclosure describes techniques in which the context derivation process to determine contexts for CABAC of syntax elements indicating prefixes of x and y coordinates of the last significant transform coefficient of a block is based on the color format of a picture that includes the block. This may result in the selection of contexts with more accurate probabilities, which ultimately may lead to superior coding efficiency.

In one example, this disclosure describes a method of decoding video data, the method comprising: determining, based on a color format of a picture of the video data, which context model from among a first context model and a second context model to use to determine a context increment for a syntax element that indicates a prefix of an x or y coordinate of a last significant transform coefficient of a color component of a block of the picture; and decoding a bin of the syntax element by applying CABAC using a context determined based on the context increment for the syntax element.

In another example, this disclosure describes a method of encoding video data, the method comprising: determining, based on a color format of a picture of the video data, which context model from among a first context model and a second context model to use to determine a context increment for a syntax element that indicates a prefix of an x or y coordinate of a last significant transform coefficient of a color component of a block of the picture; and encoding a bin of the syntax element by applying CABAC using a context determined based on the context increment for the syntax element.

In another example, this disclosure describes a device for decoding video data, the device comprising: a memory configured to store the video data; and one or more processors coupled to the memory, the one or more processors implemented in circuitry and configured to: determine, based on a color format of a picture of the video data, which context model from among a first context model and a second context model to use to determine a context increment for a syntax element that indicates a prefix of an x or y coordinate of a last significant transform coefficient of a color component of a block of the picture; and decode a bin of the syntax element by applying CABAC using a context determined based on the context increment for the syntax element.

In another example, this disclosure describes a device for encoding video data, the device comprising: a memory configured to store the video data; and one or more processors coupled to the memory, the one or more processors implemented in circuitry and configured to: determine, based on a color format of a picture of the video data, which context model from among a first context model and a second context model to use to determine a context increment for a syntax element that indicates a prefix of an x or y coordinate of a last significant transform coefficient of a color component of a block of the picture; and encode a bin of the syntax element by applying CABAC using a context determined based on the context increment for the syntax element.

In another example, this disclosure describes a device for decoding video data, the device comprising: means for determining, based on a color format of a picture of the video data, which context model from among a first context model and a second context model to use to determine a context increment for a syntax element that indicates a prefix of an x or y coordinate of a last significant transform coefficient of a color component of a block of the picture; and means for decoding a bin of the syntax element by applying CABAC using a context determined based on the context increment for the syntax element.

In another example, this disclosure describes a device for encoding video data, the device comprising: means for determining, based on a color format of a picture of the video data, which context model from among a first context model and a second context model to use to determine a context increment for a syntax element that indicates a prefix of an x or y coordinate of a last significant transform coefficient of a color component of a block of the picture; and means for encoding a bin of the syntax element by applying CABAC using a context determined based on the context increment for the syntax element.

In another example, this disclosure describes a computer-readable storage medium having stored thereon instructions that, when executed, cause one or more processors to: determine, based on a color format of a picture of video data, which context model from among a first context model and a second context model to use to determine a context increment for a syntax element that indicates a prefix of an x or y coordinate of a last significant transform coefficient of a color component of a block of the picture; and decode a bin of the syntax element by applying CABAC using a context determined based on the context increment for the syntax element.

In another example, this disclosure describes a computer-readable storage medium having stored thereon instructions that, when executed, cause one or more processors to: determine, based on a color format of a picture of video data, which context model from among a first context model and a second context model to use to determine a context increment for a syntax element that indicates a prefix of an x or y coordinate of a last significant transform coefficient of a color component of a block of the picture; and encode a bin of the syntax element by applying CABAC using a context determined based on the context increment for the syntax element.

The details of one or more examples are set forth in the accompanying drawings and the description below. Other features, objects, and advantages will be apparent from the description, drawings, and claims.

BRIEF DESCRIPTION OF DRAWINGS

FIG. 5 is a table illustrating coded symbols for the coefficients of a chunk of 16 coefficients.

FIG. 11 is a flowchart illustrating an example operation of a video encoder in accordance with one or more techniques of this disclosure.

FIG. 12 is a flowchart illustrating an example operation of a video decoder in accordance with one or more techniques of this disclosure.

DETAILED DESCRIPTION

A context model enables a video coder to determine a context to use in Context-Adaptive Binary Arithmetic Coding (CABAC). Conventionally, in Essential Video Coding (EVC), a video coder (e.g., a video encoder or a video decoder) used a first context model (e.g., a luma context model) when determining contexts to use for CABAC coding syntax elements indicating prefixes of coordinates of last significant transform coefficients of a luma component of a block and a second, different context model (e.g. a chroma context model) when determining contexts to use for CABAC coding syntax elements indicating prefixes of coordinates of last significant transform coefficients of a chroma component of the block. In this disclosure, a significant transform coefficient is a non-zero transform coefficient.

The video coder uses these two different context models in EVC because it is assumed that the color format of pictures is 4:2:0. When the color format of a picture is 4:2:0, there are half as many chroma samples as luma samples in both the horizontal and vertical directions. Because of this difference in the number of chroma samples as compared to luma samples, there may be different statistics regarding the values of bins of the syntax elements indicating prefixes of coordinates of last significant transform coefficients for luma and chroma.

However, other color formats are possible, such as 4:4:4 and 4:2:2. In a picture having the 4:4:4 color format, there are equal numbers of luma and chroma samples in both the horizontal and vertical directions. In a picture having the 4:2:2 color format, there are half as many chroma samples as luma samples in the horizontal direction and equal numbers of luma and chroma samples in the vertical direction. Using the chroma context model of EVC with the other color formats may lead to poor coding efficiency.

This disclosure describes techniques that may address this problem and may thereby improve coding efficiency. In one example, a video coder (e.g., a video encoder or a video decoder) may determine, based on a color format of a picture of the video data, which context model from among a first context model and a second context model to use to determine a context increment for a syntax element that indicates a prefix of an x or y coordinate of a last significant transform coefficient of a color component of a block of the picture. The video coder may code (e.g., encode or decode) a bin of the syntax element by applying CABAC using a context determined based on the context increment for the syntax element. By making the determination of whether to use the first context model or the second context model to determine the context increment for the syntax element, the video coder may be able to better select a context suitable for coding the bin of the syntax element. This may improve coding efficiency. In some circumstances, the same context model may be used for the luma component and the chroma component.

Figure 1:
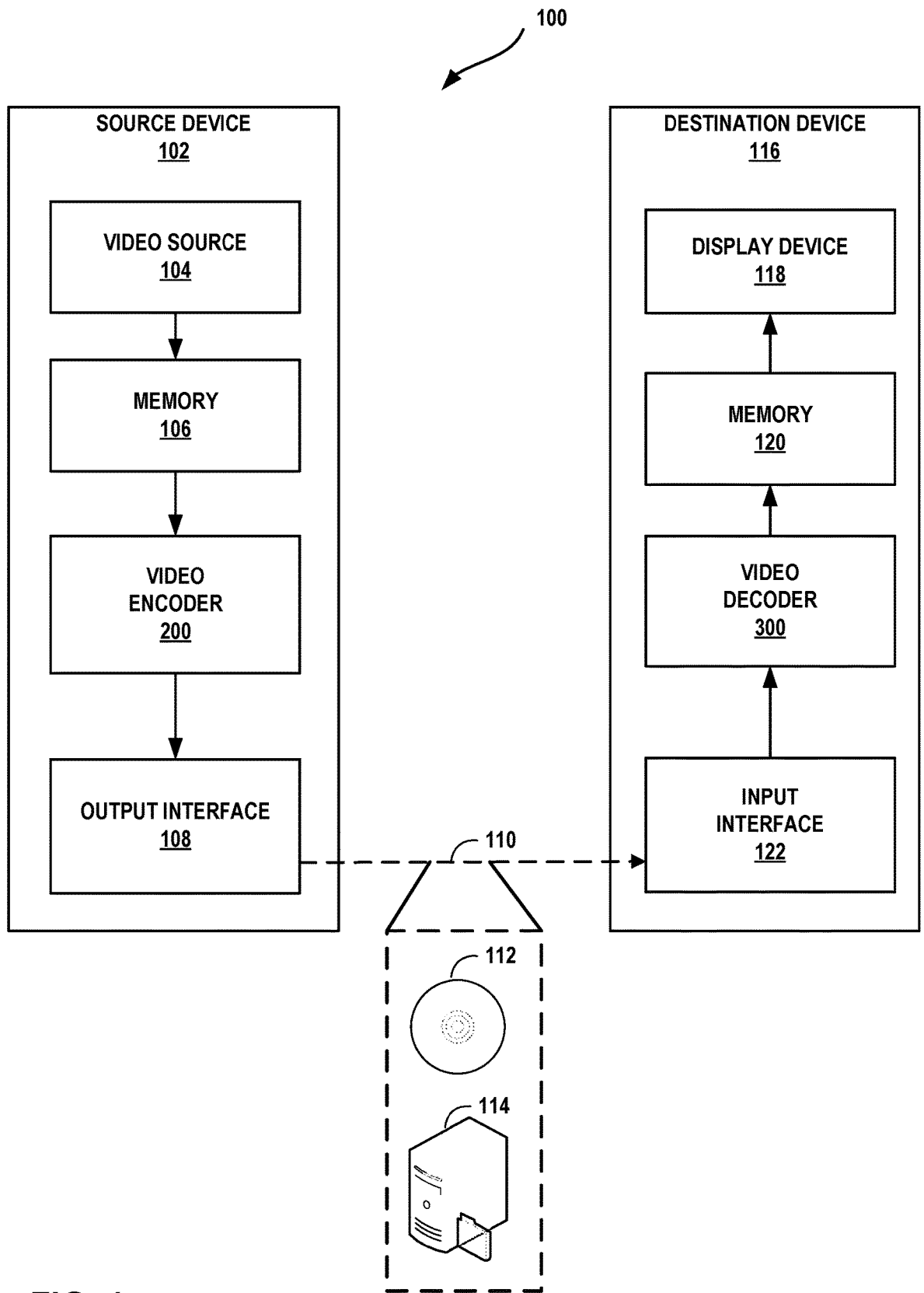
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, mobile devices, notebook (i.e., laptop) computers, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for coefficient coding for support of different color formats. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for coefficient coding for support of different color formats. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may demodulate a transmission signal including the encoded video data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). Alternatively, video encoder 200 and video decoder 300 may operate according to Essential Video Coding (EVC). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks.

Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile.

The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode syntax elements describing the one-dimensional vector, e.g., according to context-adaptive binary arithmetic coding (CABAC). Such syntax elements may include last significant transform coefficients as described in the present disclosure. Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

As mentioned above, video encoder 200 and video decoder 300 may apply CABAC encoding and decoding to values of syntax elements. To apply CABAC encoding to a syntax element, video encoder 200 may binarize the value of the syntax element to form a series of one or more bits, which are referred to as "bins." Each bin may be associated with a corresponding bin index (binIdx). In addition, video encoder 200 may identify a coding context. The coding context may identify probabilities of bins having particular values. For instance, a coding context may indicate a 0.7 probability of coding a 0-valued bin and a 0.3 probability of coding a 1-valued bin. After identifying the coding context, video encoder 200 may divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If a bin of the syntax element has the value associated with the lower sub-interval, the encoded value may be equal to the lower boundary of the lower sub-interval. If the same bin of the syntax element has the value associated with the upper sub-interval, the encoded value may be equal to the lower boundary of the upper sub-interval. To encode the next bin of the syntax element, video encoder 200 may repeat these steps with the interval being the sub-interval associated with the value of the encoded bit. When video encoder 200 repeats these steps for the next bin, video encoder 200 may use modified probabilities based on the probabilities indicated by the identified coding context and the actual values of bins encoded.

When video decoder 300 performs CABAC decoding on a value of a syntax element, video decoder 300 may identify a coding context. Video decoder 300 may then divide an interval into a lower sub-interval and an upper sub-interval. One of the sub-intervals may be associated with the value 0 and the other sub-interval may be associated with the value 1. The widths of the sub-intervals may be proportional to the probabilities indicated for the associated values by the identified coding context. If the encoded value is within the lower sub-interval, video decoder 300 may decode a bin having the value associated with the lower sub-interval. If the encoded value is within the upper sub-interval, video decoder 300 may decode a bin having the value associated with the upper sub-interval. To decode a next bin of the syntax element, video decoder 300 may repeat these steps with the interval being the sub-interval that contains the encoded value. When video decoder 300 repeats these steps for the next bin, video decoder 300 may use modified probabilities based on the probabilities indicated by the identified coding context and the decoded bins. Video decoder 300 may then de-binarize the bins to recover the value of the syntax element.

In some instances, video encoder 200 may encode bins using bypass CABAC coding. It may be computationally less expensive to perform bypass CABAC coding on a bin than to perform regular CABAC coding on the bin. Furthermore, performing bypass CABAC coding may allow for a higher degree of parallelization and throughput. Bins encoded using bypass CABAC coding may be referred to as "bypass bins." Grouping bypass bins together may increase the throughput of video encoder 200 and video decoder 300. The bypass CABAC coding engine may be able to code several bins in a single cycle, whereas the regular CABAC coding engine may be able to code only a single bin in a cycle. The bypass CABAC coding engine may be simpler because the bypass CABAC coding engine does not select contexts and may assume a probability of ½ for both symbols (0 and 1). Consequently, in bypass CABAC coding, the intervals are split directly in half.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

Figure 2A:
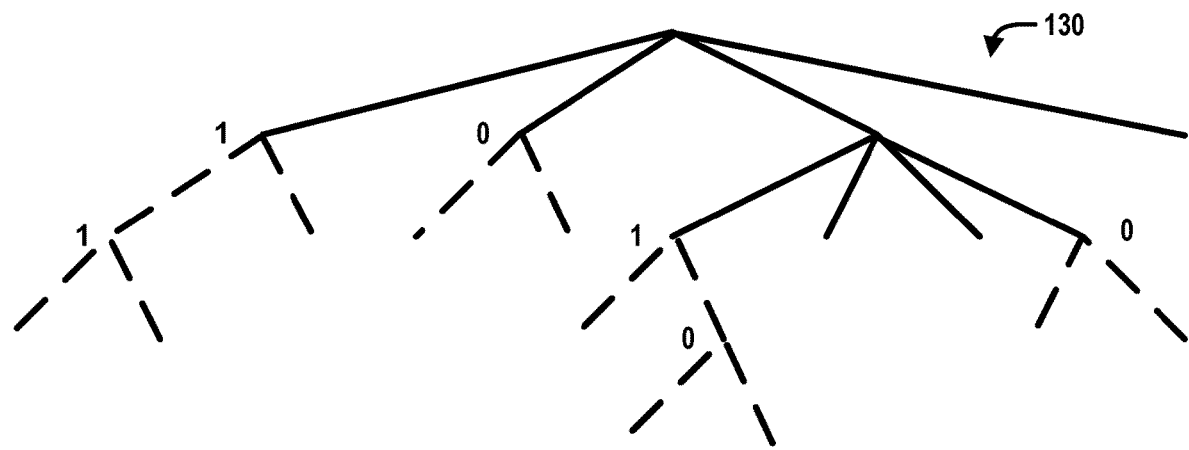
FIGS. 2A and 2B are conceptual diagrams illustrating an example quadtree binary tree (QTBT) structure and a corresponding coding tree unit (CTU).
Figure 2B:
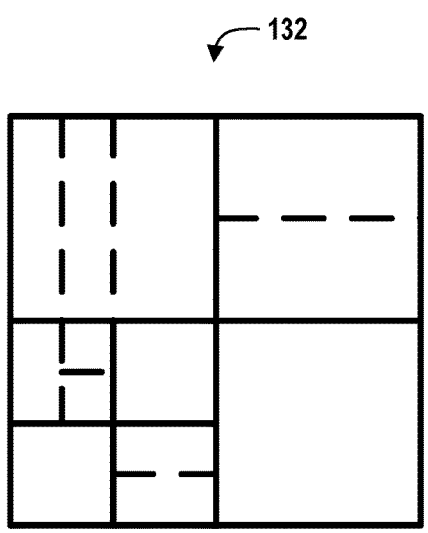

FIGS. 2A and 2B are conceptual diagrams illustrating an example quadtree binary tree (QTBT) structure 130 and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, because quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQT-Size, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), then the nodes can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction)

and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the quadtree leaf node is 128×128, the leaf quadtree node will not be further split by the binary tree, because the size exceeds the MaxBTSize (i.e., 64×64, in this example). Otherwise, the quadtree leaf node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has a width equal to MinBTSize (4, in this example), it implies that no further vertical splitting is permitted. Similarly, a binary tree node having a height equal to MinBTSize implies that no further horizontal splitting is permitted for that binary tree node. As noted above, leaf nodes of the binary tree are referred to as CUs, and are further processed according to prediction and transform without further partitioning.

At the 124th MPEG meeting in Macao, China, a Call for a New Video Codec was issued. Submitted CfP responses were evaluated at the 125th MPEG meeting in Marrakesh, Morocco, and technology from proposal m46354 was selected to form a basis for Working Draft and Test Model of Essential Video Coding Standard. The following section of the disclosure provides a description of the transform coding method utilized in MPEG5 EVC and implemented in ETM5.0

Discrete Cosine Transform (DCT2) transforms are applied to a residual block between an original block and the corresponding prediction block, as a conventional hybrid video codec does. In order to support a 64×64 pipeline, the maximum allowed transform size is set to 64. If the length of a side of a CU is greater than the maximum transform size, the side is automatically split into two partitions.

In addition to the normal DCT2 transform, an Adaptive Transform Selection (ATS) method can be used for intra and inter prediction cases. Table 1 shows basis functions for kernel design of adaptive transform selection.

TABLE 1

Transform basis functions of DCT-8 and DST-7 for N-point input

| Transform Type | Basis function $T_i(j)$, $i, j = 0, 1, \ldots, N-1$ |
| --- | --- |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

ATS is applied to the block that is smaller than 32 block size with both width and height. If width or height is over 32 pixels in length, ATS is not considered to be applied to the block.

For an intra coded block, a flag is used to signal to video decoder 300 whether ATS is applied or not. If video encoder 200 selects use of ATS in a CU as a core transform, video encoder 200 signals two more flags to video decoder 300 to indicate which type of transform is used for the horizontal and vertical directions, respectively. The value 0 indicates DST-7 is used and value 1 indicates DCT-8 is used.

Figure 3:
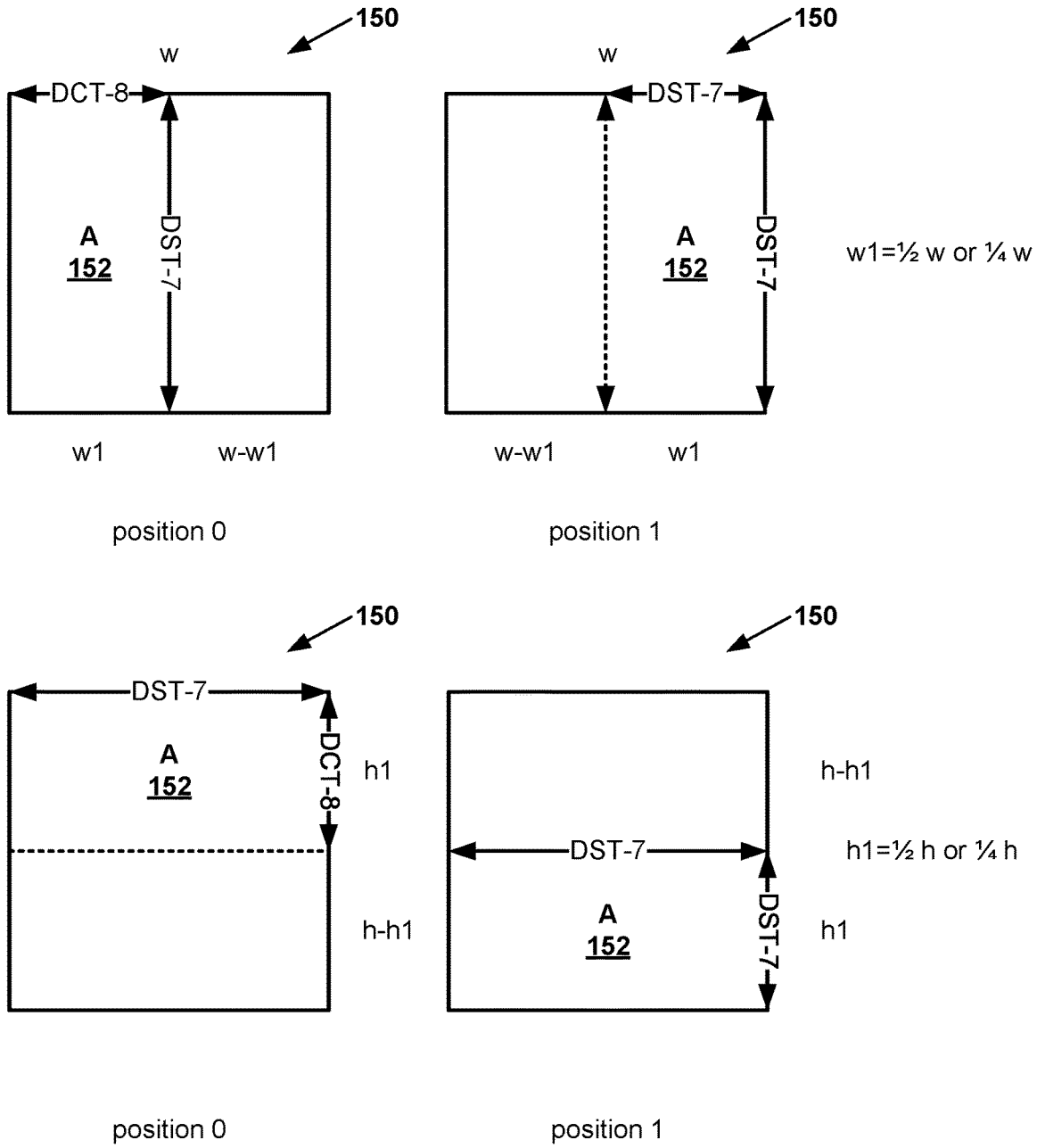
FIG. 3 is a conceptual diagram illustrating adaptive transform selection for an inter coded block.

For an inter-predicted CU that has residuals (i.e., an inter-predicted CU that has a residual block), video encoder 200 may signal whether the whole residual block or a sub-part of the residual block should be decoded. When only a sub-part of the residual block should be coded, that sub-part of the residual block is encoded with an inferred transform type and the other sub-part of the residual block is zeroed out. The sub-part position information and corresponding transform type are illustrated in FIG. 3. FIG. 3 is a conceptual diagram illustrating adaptive transform selection for an inter coded block 150. In the example of FIG. 3, sub-parts 152 containing residual information are indicated as A 152. The sub-part that contains residual information can be half or one quarter size of the current CU. ATS is allowed for CUs with widths and heights that are both no larger than 64. FIG. 3 also shows that the transform type is derived based on the position of the sub-block, instead of signaling the transform type as done for intra coded CU. For example, the horizontal and vertical transforms for the position 0 sub-parts are DCT-8 and DST-7, respectively. When at least one side of the residual TU is greater than 32, the transform is set as DCT-2.

After the transform is conducted, scalar quantization is applied to the transformed coefficients. The range of the quantization parameter (QP) may be from 0 to 51 and a scaling factor (SF) corresponding to each QP is defined by a look-up table. Video encoder 200 may scan transform coefficients of the coded block after quantization in a predefined scan pattern and entropy encode them. To further employ statistical properties of transform coefficients, a bit-plane based coefficient coding method, so called Advanced Coefficient Coding (ADCC), is utilized in the Main Profile of EVC instead of the run-length coding method currently used. The ADCC method utilizes the following design elements:
1. Fixed zig-zag scan pattern.
2. Signaling coordinates of the last non-zero transform coefficient in the scan order.
3. Parsing transform coefficients in chunks of 16.
4. Signaling transform coefficients within each processing chunk as a sequence of significance and levels flags, sign flag and remaining levels.

Among these symbols (i.e., significance and levels flags, sign flag and remaining levels), the bins of sigMapFlag, flagLevelA and flagLevelB are encoded with adaptive context models; signFlag and binarized bins of levelRem are encoded through by-pass mode. A value sigMapFlag may indicate whether a corresponding transform coefficient is a significant transform coefficient. A value of flagLevelA may indicate whether a level of a corresponding transform coefficient is greater than or equal to a level A. A value of flagLevelB may indicate whether a level of a corresponding transform coefficient is greater than or equal to a level B. A value of signFlag indicates whether a level of a transform coefficient is positive or negative. A value of a levelRem indicates a remainder of a level of a transform coefficient.

To decrease the number of context-coded bins, explicit flagLevelA and flagLevelB can be adaptively switched into levelRem coding, which is binarized with Golomb code and encoded with bypass mode with equal probability. To improve the throughput, the number of explicitly coded symbols flagLevelA and flagLevelB within a coded chunk is limited. Only the first N flagLevelA and the first M flagLevelB symbols are coded. Explicit coding of these symbols is omitted when the specified threshold is met.

Figure 4:
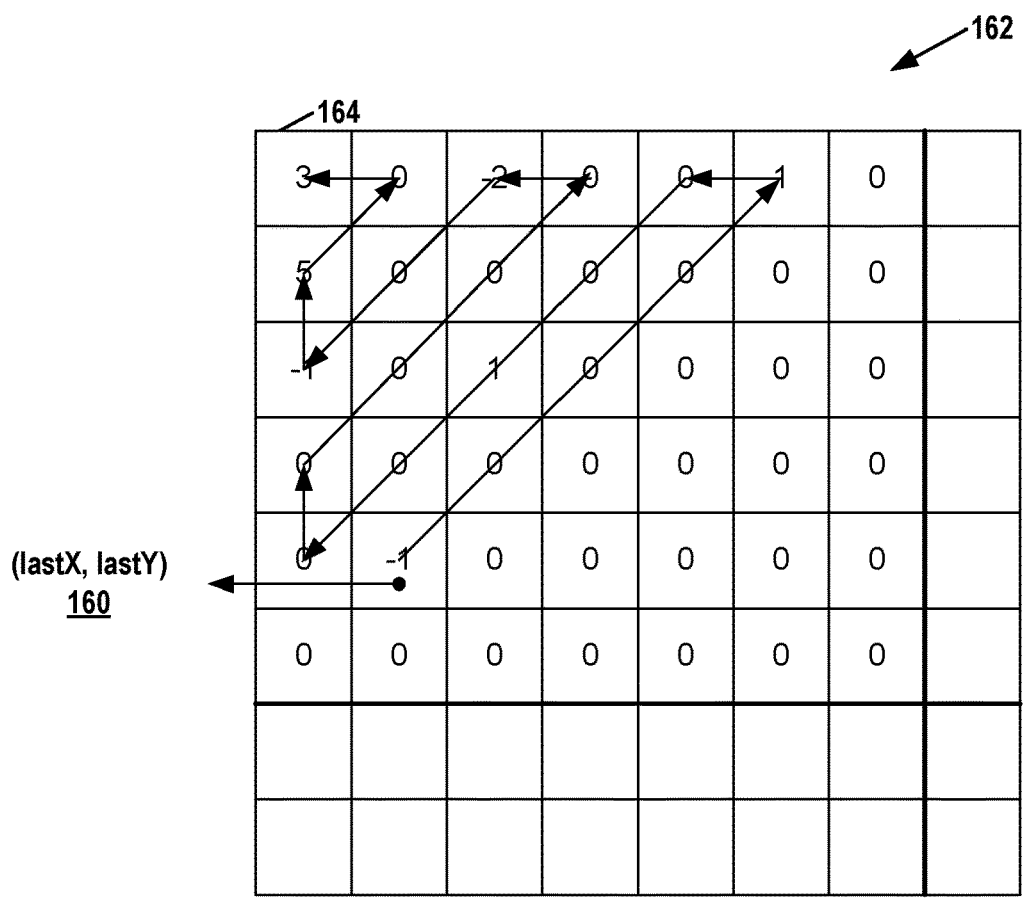
FIG. 4 is a conceptual diagram illustrating a coefficient scan method and last coefficient position.

A visualization of the method is given in FIG. 4. Specifically, FIG. 4 is a conceptual diagram illustrating a coefficient scan method and last transform coefficient position 160. FIG. 4 shows transform coefficients of a block 162. The arrows indicate a zig-zag scan pattern that starts from the "last" significant transform coefficient in terms of positions along the zig-zag scan pattern from the DC transform coefficient 164.

FIG. 5 is a table 170 illustrating coded symbols for the coefficients of a chunk of 16 coefficients. In other words, FIG. 5 gives an example of coded symbols for a chunk of 16 transform coefficients, with N=1. Symbols with omitted signaling are marked with X in FIG. 5.

A portion of the transform coefficient coding (i.e., a portion of the transform_unit syntax structure) is defined in MPEG5 EVC as shown in Table 2, below.

TABLE 2

```
if( cbf_luma )
    residual_coding( x0 + TrafoX0, y0 +
        TrafoY0, TrafoLog2Width, TrafoLog2Height, 0 )
if( cbf_cb )
    residual_coding( x0 + TrafoX0, y0 +
        TrafoY0, TrafoLog2Width − 1, TrafoLog2Height −
SubHeightC + 1, 1 )
if( cbf_cr )
```

TABLE 2-continued

```
    residual_coding( x0 + TrafoX0, y0 +
        TrafoY0, TrafoLog2Width − 1, TrafoLog2Height −
SubHeightC + 1, 2 )
```

The residual_coding syntax structure referenced in Table 2, above, may be implemented as reproduced in Table 3, below. As seen in Table 3, the values log2TbWidth and log2TbHeight are passed into the residual_coding syntax structure from the transform_unit syntax structure and from the residual_coding syntax structure into the residual_coding_adv syntax structure.

TABLE 3

| | Descriptor |
|---|---|
| residual_coding ( x0, y0, log2TbWidth, log2TbHeight, cIdx ) { <br>   if( sps_adcc_flag = = 0 ) <br>     residual_coding_rle( x0, y0, log2TbWidth, <br>       log2TbHeight, cIdx ) <br>   else <br>     residual_coding_adv( x0, y0, log2TbWidth, <br>       log2TbHeight, cIdx ) | |

The residual_coding syntax structure from the transform_unit syntax structure may be implemented as shown in Table 4, below, shows a portion of the residual_coding_adv syntax structure.

TABLE 4

| | Descriptor |
|---|---|
| residual_coding_adv( x0, y0, log2TbWidth, log2TbHeight, cIdx ) { | |
|   last_sig_coeff_x_prefix | ae(v) |
|   last_sig_coeff_y_prefix | ae(v) |
|   if( last_sig_coeff_x_prefix > 3 ) | |
|     last_sig_coeff_x_suffix | ae(v) |
|   if( last_sig_coeff_y_prefix > 3 ) | |
|     last_sig_coeff_y_suffix | ae(v) |
|   rasterPosLast = LastSignificantCoeffX + LastSignificantCoeffY * ( 1 << log2TbWidth ) | |
|   scanPosLast = InvScanOrder[ log2TbWidth ][ log2TbHeight ][ rasterPosLast ] | |
|   lastCoefGroup = scanPosLast >> 4 | |
|   iPos = scanPosLast | |
|   for( cgIdx = lastCoefGroup; cgIdx >= 0; cgIdx− − ) { | |
|     escapeDataPresent = 0 | |
|     numNZ = 0 | |
|     subBlockPos = cgIdx << 4 | |
|     for( ; iPos >= subBlockPos; iPos− − ) { | |
|       blkPos = ScanOrder[ log2TbWidth ][ log2TbHeight ][ iPos ] | |
|       xC = blkPos & ( ( 1 << log2TbWidth ) − 1 ) | |
|       yC = blkPos >> log2TbWidth | |
|       if( iPos != scanPosLast ) | |
|         sig_coeff_flag[ xC ][ yC ] | ae(v) |
|       else | |
|         sig_coeff_flag[ xC ][ yC ] = 1 | |
|       TransCoeffLevel[ x0 ][ y0 ][ cIdx ][ xC ][ yC ] = sig_coeff_flag[ xC ][ yC ] | |
|       if( TransCoeffLevel[ x0 ][ y0 ][ cIdx ][ xC ][ yC ] ) { | |
|         blkPosArray[ numNZ ] = blkPos | |
|         numNZ+ + | |
|       } | |
|     } | |
|     if( numNZ > 0 ) { | |
|       lastGreaterAScanPos = −1 | |
|       numC1Flag = Min( numNZ, 8 ) | |
|       for( n = 0; n < numC1Flag; n+ + ) { | |
|         blkPos = blkPosArray[ n ] | |
|         xC = blkPos & ( ( 1 << log2TbWidth ) − 1 ) | |
|         yC = blkPos >> log2TbWidth | |
|         coeff_abs_level_greaterA_flag[ n ] | ae(v) |
|         TransCoeffLevel[ x0 ][ y0 ][ cIdx ][ xC ][ yC ] += | |

TABLE 4-continued

Descriptor

```
                        coeff_abs_level_greaterA_flag[ n ]
                    if( coeff_abs_level_greaterA_flag[ n ] )
                        if( lastGreaterAScanPos = = -1 )
                            lastGreaterAScanPos = n
                        else
                            escapeDataPresent = 1
                }
                if( lastGreaterAScanPos != -1 ) {
                    blkPos = blkPosArray[ lastGreaterAScanPos ]
                    xC = blkPos & ( ( 1 << log2TbWidth ) - 1 )
                    yC = blkPos >> log2TbWidth
                    coeff_abs_level_greaterB_flag[ lastGreaterAScanPos ]           ae(v)
                    TransCoeffLevel[ x0 ][ y0 ][ cIdx ][ xC ][ yC ] +=
                                coeff_abs_level_greaterB_flag[ lastGreaterAScanPos ]
                    if( coeff_abs_level_greaterB_flag[ lastGreaterAScanPos ] )
                        escapeDataPresent = 1
                }
                escapeDataPresent = escapeDataPresent | | ( numNZ > 8 )
                countFirstBCoef = 1
                if( escapeDataPresent ) {
                    for( n = 0; n < numNZ; n++ ) {
                        blkPos = blkPosArray[ n ]
                        xC = blkPos & ( ( 1 << log2TbWidth ) - 1 )
                        yC = blkPos >> log2TbWidth
                        baseLevel = ( n < 8 ) ? ( 2 + countFirstBCoef ) : 1
                        if( TransCoeffLevel[ x0 ][ y0 ][ cIdx ][ xC ][ yC ] >= baseLevel )
{
                            coeff_abs_level_remaining[ n ]                          ae(v)
                            TransCoeffLevel[ x0 ][ y0 ][ cIdx ][ xC ][ yC ] =
                                    baseLevel + coeff_abs_level_remaining
                        }
                        if( TransCoeffLevel[ x0 ][ y0 ][ cIdx ][ xC ][ yC ] >= 2 )
                            countFirstBCoef = 0
                    }
                }
                coeff_signs_group                                                   ae(v)
                coeff_signs_group = coeff_signs_group << ( 32 - numNZ )
                for( n = 0; n < numNZ; n++ ) {
                    blkPos = blkPosArray[ n ]
                    xC = blkPos & ( ( 1 << log2TbWidth ) - 1 )
                    yC = blkPos >> log2TbWidth
                    signVal = coeff_signs_group >> 31
                    coeff_signs_group = coeff_signs_group << 1
                    TransCoeffLevel[ x0 ][ y0 ][ cIdx ][ xC ][ yC ] = signVal > 0 ?
                            -TransCoeffLevel[ x0 ][ y0 ][ cIdx ][ xC ][ yC ] :
                                TransCoeffLevel[ x0 ][ y0 ][ cIdx ][ xC ][ yC ]
                }
            }
        }
    }
}
```

In Table 4, above, the syntax element last_sig_coeff_x_prefix may specify a prefix of the column (x) position of the last significant transform coefficient in scanning order within a transform block. The syntax element last_sig_coeff_y_prefix may specify the prefix of the row (y) position of the last significant transform coefficient in scanning order within a transform block. If last_sig_coeff_x_suffix is not present, the column position (i.e., x-coordinate) of the last significant transform coefficient (LastSignificantCoeffX) may be equal to the value of last_sig_coeff_x_prefix. Otherwise (last_sig_coeff_x_suffix is present), the following may apply:

LastSignificantCoeffX=(1<((last_sig_coeff_x_prefix>>1)−1))*(2+(last_sig_coeff_x_prefix & 1))+last_sig_coeff_x_suffix Similarly, if last_sig_coeff_y_suffix is not present, the row position (i.e., y-coordinate) of the last significant transform coefficient (LastSignificantCoeffY) may be equal to last_sig_coeff_y_prefix. Otherwise (last_sig_coeff_y_suffix is present), the following may apply:

LastSignificantCoeffY=(1<((last_sig_coeff_y_prefix>>1)−1))*(2+(last_sig_coeff_y_prefix & 1))+last_sig_coeff_y_suffix A video coder (e.g., video encoder 200 or video decoder 300) may perform a derivation process of a context increment (ctxInc) for the syntax elements last_sig_coeff_x_prefix and last_sig_coeff_y_prefix. The video coder may determine a context based on the context increment. In some examples, to determine the context based on the context increment, the video coder may determine a context index by adding the context increment to a context offset value (ctxIdxOffset) for a syntax element (e.g., last_sig_coeff_x_prefix and last_sig_coeff_y_prefix). The context offset value may be equal to a lowest context index value available for use with the syntax element. The following text describes the derivation process implemented in ETM5.0.

Inputs to this process are the variable binIdx, the color component index cIdx and the associated transform size log 2TrafoSize which is log 2TbWidth for last_sig_coeff_x_prefix and log 2TbHeight for last_sig_coeff_y_prefix, respectively. Output of this process is the variable ctxInc.

The variables ctxOffset and ctxShift are derived as follows:
If cIdx is equal to 0, the following applies:
If log 2TrafoSize is less than 6, ctxOffset is set equal to 3*(log 2TrafoSize-2)+((log 2TrafoSize-1)>>2) and ctxShift is set equal to (log 2TrafoSize+1)>>2.
Otherwise (log 2TrafoSize is greater than or equal to 6), ctxOffset is set equal to 3*(log 2TrafoSize-2)+((log 2TrafoSize-1)>>2)+((1<<<log 2TrafoSize)>>6)<<<1)+((1<<<log 2TrafoSize)>>7) and ctxShift is set equal to ((log 2TrafoSize+1)>>2)<<<1.
Otherwise (cIdx is greater than 0), ctxOffset is set equal to 18 and ctxShift is set equal to Max(0, log 2TrafoSize-2)-Max(0, log 2TrafoSize-4).
The variable ctxInc is derived as follows:

$$\text{ctxInc}=(\text{binIdx}>>\text{ctxShift})+\text{ctxOffset} \quad (9\text{-}1)$$

In the text above, log 2TrafoSize specifies the associated transform size, which is log 2TbWidth for last_sig_coeff_x_prefix and log 2TbHeight for last_sig_coeff_y_prefix, respectively. The variable log 2TbWidth is equal to the log base-2 value of the width of the transform block. The video coder may repeat this operation for each bin of last_sig_coeff_x_prefix and last_sig_coeff_y_prefix. The bins of last_sig_coeff_x_prefix and last_sig_coeff_y_prefix may be individual binary digits of binarized versions of last_sig_coeff_x_prefix and last_sig_coeff_y_prefix.

Transform coefficient coding as it is specified in MPEG5 EVC does not anticipate coding of a video signal with a color format different from 4:2:0, namely when chroma component data is presented at quarter resolution as compared to the luma component. Enabling support for color formats different from 4:2:0 may increase coding efficiency for compressing video of color formats different from 4:2:0.

This disclosure describes techniques that may enable support of coding video signals in color formats other than 4:2:0 color formats. The techniques of this disclosure may thereby increase coding efficiency for compressing video of color formats different from 4:2:0. The techniques of this disclosure may be used together or separately.

In accordance with a first technique of this disclosure, a video coder (e.g., video encoder 200 or video decoder 300) may invoke residual coding operations for non-luma (cIdx not equal to 0) color components with block sizes that are a function of chroma format indicator. The following text describes the semantics in ETM 5.0 of the chroma_format_idc syntax element.

chroma_format_idc specifies the chroma sampling relative to the luma sampling as specified in clause 6.2. The value of chroma_format_idc shall be in the range of 0 to 3, inclusive. Depending on the value of chroma_format_idc, the value of the variables SubWidthC, and SubHeightC are assigned as specified in clause 6.2 and the variable ChromaArrayType is assigned as follows:
If chroma_format_idc is equal to 0, ChromaArrayType is set equal to 0.
Otherwise, ChromaArrayType is set equal to chroma_format_idc.
Furthermore, the following text from clause 6.2 of ETM 5.0 describes color formats.
The variables SubWidthC and SubHeightC are specified in Table 6-1, depending on the chroma format sampling structure, which is specified through chroma_format_idc. Other values of chroma_format_idc, SubWidthC and SubHeightC may be specified in the future by ISO/JEC.

TABLE 6-1

SubWidthC and SubHeightC values derived from chroma_format_idc

| chroma_format_idc | Chroma format | SubWidthC | SubHeightC |
| --- | --- | --- | --- |
| 0 | Monochrome | 1 | 1 |
| 1 | 4:2:0 | 2 | 2 |
| 2 | 4:2:2 | 2 | 1 |
| 3 | 4:4:4 | 1 | 1 |

In monochrome sampling, there is only one sample array, which is nominally considered the luma array.
In 4:2:0 sampling, each of the two chroma arrays has half the height and half the width of the luma array.
In 4:2:2 sampling, each of the two chroma arrays has the same height and half the width of the luma array.
In 4:4:4 sampling, each of the two chroma arrays has the same height and width as the luma array.

In accordance with the first technique of this disclosure, the text of ETM 5.0 may be changed, as shown in Table 5, below, to account for the different values of SubWidthC and SubHeightC in different color formats as determined in Table 6-1. In this disclosure, proposed changes to the transform_unit syntax structure of EVC are shown in <!> . . . </!> tags.

TABLE 5

```
if( cbf_luma)
    residual_coding( x0 + TrafoX0, y0 +
        TrafoY0, TrafoLog2Width, TrafoLog2Height, 0 )
if( cbf_cb )
    residual_coding( x0 + TrafoX0, y0 +
        TrafoY0, TrafoLog2Width <!>- SubWidthC +
1</!>, TrafoLog2Height - SubHeightC +1, 1 )
if( cbf_cr )
    residual_coding( x0 + TrafoX0, y0 +
        TrafoY0, TrafoLog2Width <!>- SubWidthC +
1</!>, TrafoLog2Height - SubHeightC + 1, 2 )
}
```

Because the values of SubWidthC and SubHeightC are dependent on the color format and TrafoLog 2Width and TrafoLog 2Height are modified in Table 5 based on the SubWidthC and SubHeightC, the values of TrafoLog 2Width and TrafoLog 2Height are modified based on the color format. Thus, correct values of TrafoLog 2Width and TrafoLog 2Height may be used in the residual_coding and residual_coding_adv syntax structures shown in Tables 3 and 4 for different color formats. Using the correct values of TrafoLog 2Width and TrafoLog 2Height in the residual_coding_adv syntax structure may enable correct syntax elements to be signaled for different color formats.

Thus, in an example constituent with the first technique of this disclosure, a video coder (e.g., video encoder 200 or video decoder 300) may determine, based on a chroma format indicator (chroma_format_idc) applicable to a block of the video data, parameters of a residual coding operation. For instance, the video coder may determine one parameter of the residual coding operation as TrafoLog 2Width−SubWidthC+1, and may determine another parameter of the residual coding operation as TrafoLog 2Height−SubHeightC+1. The video coder may then perform, based on the determined parameters of the residual coding operation, the residual coding operation to code residual data for a non-luma component of the block.

A second technique of this disclosure may improve performance of the coefficient coding for non-luma (cIdx not equal to 0) by allowing more efficient context modeling. In accordance with the second technique of this disclosure, a luma-context model (i.e., a context model that is utilized for components at full resolution video signal, such as luma components) may be enabled for context-coded syntax elements in chroma components for color formats different from 4:2:0, namely in color_format_idc non-equal to 1. Proposed changes to ETM 5.0 in accordance with the second technique of this disclosure are shown in <!> . . . </!> tags. Derivation Process of ctxInc for the Syntax Elements last_sig_coeff_x_prefix and last_sig_coeff_y_prefix Inputs to this process are the variable binIdx, the colour component index cIdx and the associated transform size log 2TrafoSize which is log 2TbWidth for last_sig_coeff_x_prefix and log 2TbHeight for last_sig_coeff_y_prefix, respectively. Output of this process is the variable ctxInc.

<!> The variables enableLumaModel is set equal to FALSE and modified as follows:

If chromaArrayType is equal to 0 or 3, the variable enableLumaModel is set equal to TRUE.

Otherwise, if chromaArrayType is equal to 1 or to 2, and cIdx is equal to 0, the variable enableLumaModel is set equal to TRUE.

Otherwise, if chromaArrayType is equal to 2, and cIdx is not equal to 0, and syntax element to be parsed is last_sig_coeff_y_prefix, the variable enableLumaModel is set equal to TRUE.</!>

The variables ctxOffset and ctxShift are derived as follows:

If <!>enableLumaModel is equal to TRUE</!>, the following applies:

<^>If log 2TrafoSize is less than 6, ctxOffset is set equal to 3*(log 2TrafoSize−2)+((log 2TrafoSize−1)>>2) and ctxShift is set equal to (log 2TrafoSize+1)>>2.

Otherwise (log 2TrafoSize is greater than or equal to 6), ctxOffset is set equal to 3*(log 2TrafoSize−2)+((log 2TrafoSize−1)>>2)+((1<<log 2TrafoSize)>>6)<<<1)+((1<<log 2TrafoSize)>>7) and ctxShift is set equal to ((log 2TrafoSize+1)>>2)<<1.</^>

Otherwise (<!>enableLumaModel is equal to FALSE</!>), ctxOffset is set equal to 18 and ctxShift is set equal to Max(0, log 2TrafoSize−2)−Max(0, log 2TrafoSize−4).

The variable ctxInc is derived as follows:

$$ctxInc=(binIdx>>ctxShift)+ctxOffset \quad (9-2)$$

Thus, as shown in the text above, the luma context model (i.e., the text marked with <^> . . . </^> tags) may be used for luma components and also chroma components in some circumstances. Hence, in accordance with the second technique of this disclosure, a video coder (e.g., video encoder 200 or video decoder 300) may use a context model to derive a context increment for a first syntax element (e.g., last_sig_coeff_x_prefix or last_sig_coeff_y_prefix). The first syntax element indicates a prefix of an x or y coordinate of a last significant transform coefficient of a luma component of a block of a picture of the video data. Additionally, the video coder may apply CABAC to a bin of the first syntax element using a context determined based on the context increment for the first syntax element. The video coder may use the same or different context model to derive a context increment for a second syntax element (e.g., last_sig_coeff_x_prefix or last_sig_coeff_y_prefix), depending in part on the color format of the picture. The second syntax element indicates a prefix of an x or y coordinate of a last significant transform coefficient of a chroma component of the block. The video coder may apply CABAC to a bin of the second syntax element using a context determined based on the context increment for the second syntax element.

Thus, in some examples, video encoder 200 may determine, based on a color format of a picture of the video data, which context model from among a first context model and a second context model (e.g., as defined by the value of the variable enableLumaModel) to use to determine a context increment (ctxInc) for a syntax element (e.g., last_sig_coeff_x_prefix or last_sig_coeff_y_prefix) that indicates a prefix of an x or y coordinate of a last significant transform coefficient of a color component of a block of the picture. Video encoder 200 may encode a bin of the syntax element by applying CABAC using a context determined based on the context increment for the syntax element. In some examples, as mentioned above, an index of the context (with regard to a set of predefined contexts) may be determined from a sum of the context increment and an offset value which may be predefined. Likewise, video decoder 300 may determine, based on a color format of a picture of the video data, which context model from among a first context model and a second context model to use to determine a context increment (ctxInc) for a syntax element (e.g., last_sig_coeff_x_prefix or last_sig_coeff_y_prefix) that indicates a prefix of an x or y coordinate of a last significant transform coefficient of a color component of a block of the picture. Video decoder 300 may encode a bin of the syntax element by applying CABAC using a context determined based on the context increment for the syntax element.

In some examples, using the first context model comprises performing one of: based on a log base-2 value of a transform size of the block being less than 6, setting a context offset to 3*(log 2TrafoSize−2)+((log 2TrafoSize−1)>>2) and setting a context shift equal to (log 2TrafoSize+1)>>2, where log 2TrafoSize indicates the log base-2 value of the transform size. Alternatively, based on the log base-2 value of the transform size being greater than or equal to 6, the video coder may set a context offset to 3*(log 2TrafoSize−2)+((log 2TrafoSize−1)>>2)+((1<<log 2TrafoSize)>>6)<<<1)+((1<<log 2TrafoSize)>>7) and set a context shift equal to ((log 2TrafoSize+1)>>2)<<<1. The video coder may determine a context increment as (binIdx>>ctxShift)+ctxOffset, where binIdx is a bin index of a bin of an applicable syntax element, ctxShift indicates the context shift, and ctxOffset indicates the context offset, wherein the applicable syntax element is the first syntax element or the second syntax element. In some examples, using the second context model comprises setting a context offset ctxOffset for the second syntax element to 18 and setting a context shift ctxShift for the applicable syntax element to Max(0, log 2TrafoSize−2)−Max(0, log 2TrafoSize−4), where Max indicates a maximum function and log 2TrafoSize indicates a log base-2 value of a transform size of the block. Furthermore, using the second context model may comprise determining the context increment for the second syntax element as (binIdx>>ctxShift)+ctxOffset, where binIdx is a bin index of a bin of the applicable syntax element.

Figure 6:
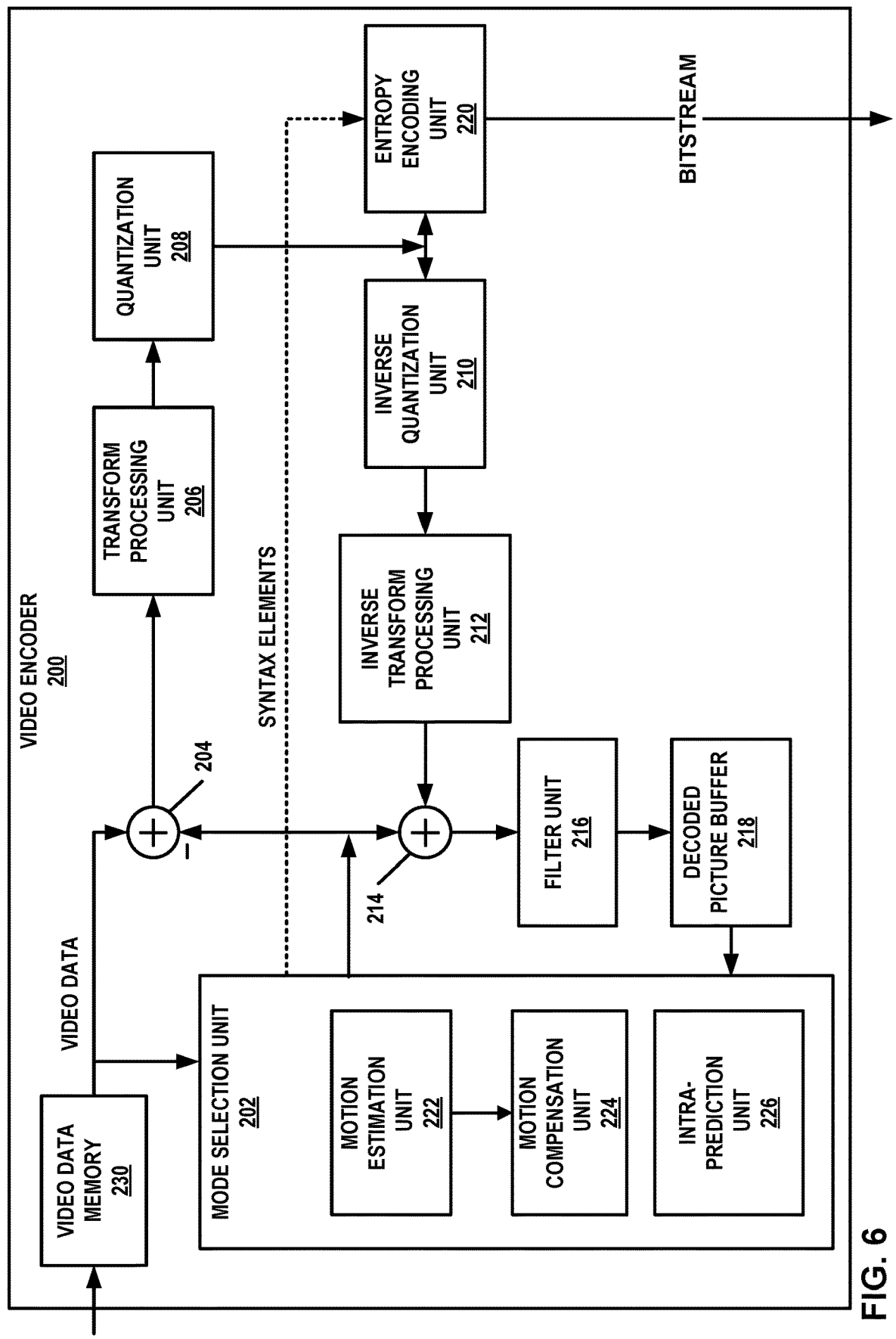
FIG. 6 is a block diagram illustrating an example video encoder that may perform the techniques of this disclosure.

FIG. 6 is a block diagram illustrating an example video encoder 200 that may perform the techniques of this disclosure. FIG. 6 is provided for purposes of explanation and should not be considered limiting of the techniques as broadly exemplified and described in this disclosure. For purposes of explanation, this disclosure describes video encoder 200 according to the techniques of VVC (ITU-T H.266, under development), HEVC (ITU-T H.265), and EVC. However, the techniques of this disclosure may be performed by video encoding devices that are configured to other video coding standards.

In the example of FIG. 6, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, of FPGA. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 6 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as a few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

In accordance with one or more techniques of this disclosure, entropy encoding unit 220 may determine, based on a color format of a picture of the video data, which context model from among a first context model and a second context model to use to determine a context increment for a syntax element that indicates a prefix of an x or y coordinate of a last significant transform coefficient of a color component of a block of the picture. Entropy encoding unit 220 may encode a bin of the syntax element by applying CABAC using a context determined based on the context increment for the syntax element. In some examples, entropy encoding unit 220 may use the first context model or the second context model to derive a context increment for a syntax element (e.g., last_sig_coeff_x_prefix or last_sig_coeff_y_prefix) that indicates a prefix of an x or y coordinate of a last significant transform coefficient of a color component of a block of a picture of the video data. Entropy encoding unit 220 may apply CABAC to a bin of the first syntax element using a context determined based on the context increment for the syntax element. Entropy encoding unit 220 may use the first context model when the color component is luma or when the color component is a chroma component and the color format is different from 4:2:0. When using the first context model, entropy encoding unit 220 may, based on a log base-2 value of a transform size of the block being less than 6, set a context offset to 3*(log 2TrafoSize−2)+((log 2TrafoSize−1)>>2) and set a context shift equal to (log 2TrafoSize+1)>>2, where log 2TrafoSize indicates the log base-2 value of the transform size. Entropy encoding unit 220 may, based on the log base-2 value of the transform size being greater than or equal to 6, set a context offset to 3*(log 2TrafoSize−2)+((log 2TrafoSize−1)>>2)+ ((1<<log 2TrafoSize)>>6)<<<1)+((1<<<log 2TrafoSize)>>7) and set a context shift equal to ((log 2TrafoSize+1)>>2)<<<1. Entropy encoding unit 220 may determine the context increment as (binIdx>>ctxShift)+ ctxOffset, where binIdx is a bin index of a bin of an applicable syntax element, ctxShift indicates the context shift, and ctxOffset indicates the context offset. The applicable syntax element may be the first syntax element or the second syntax element.

Video encoder 200 may output a bitstream that includes the entropy encoded syntax elements needed to reconstruct blocks of a slice or picture. For example, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying an MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 may represent an example of a device configured to encode video data including a memory configured to store video data, and one or more processing units implemented in circuitry and configured to determine, based on a chroma format indicator applicable to a block of the video data, parameters of a residual coding operation. The one or more processing units may perform, based on the determined parameters of the residual coding operation, the residual coding operation to encode residual data for a non-luma component of the block. In some examples, the one or more processing units may be configured to use a context model for entropy encoding a prefix of a y coordinate of a last significant transform coefficient of a luma component of a block; and use the same context model for entropy encoding a prefix of a y coordinate of a last significant transform coefficient of a chroma component of the block based on a color format of the block being 4:2:2.

Figure 7:
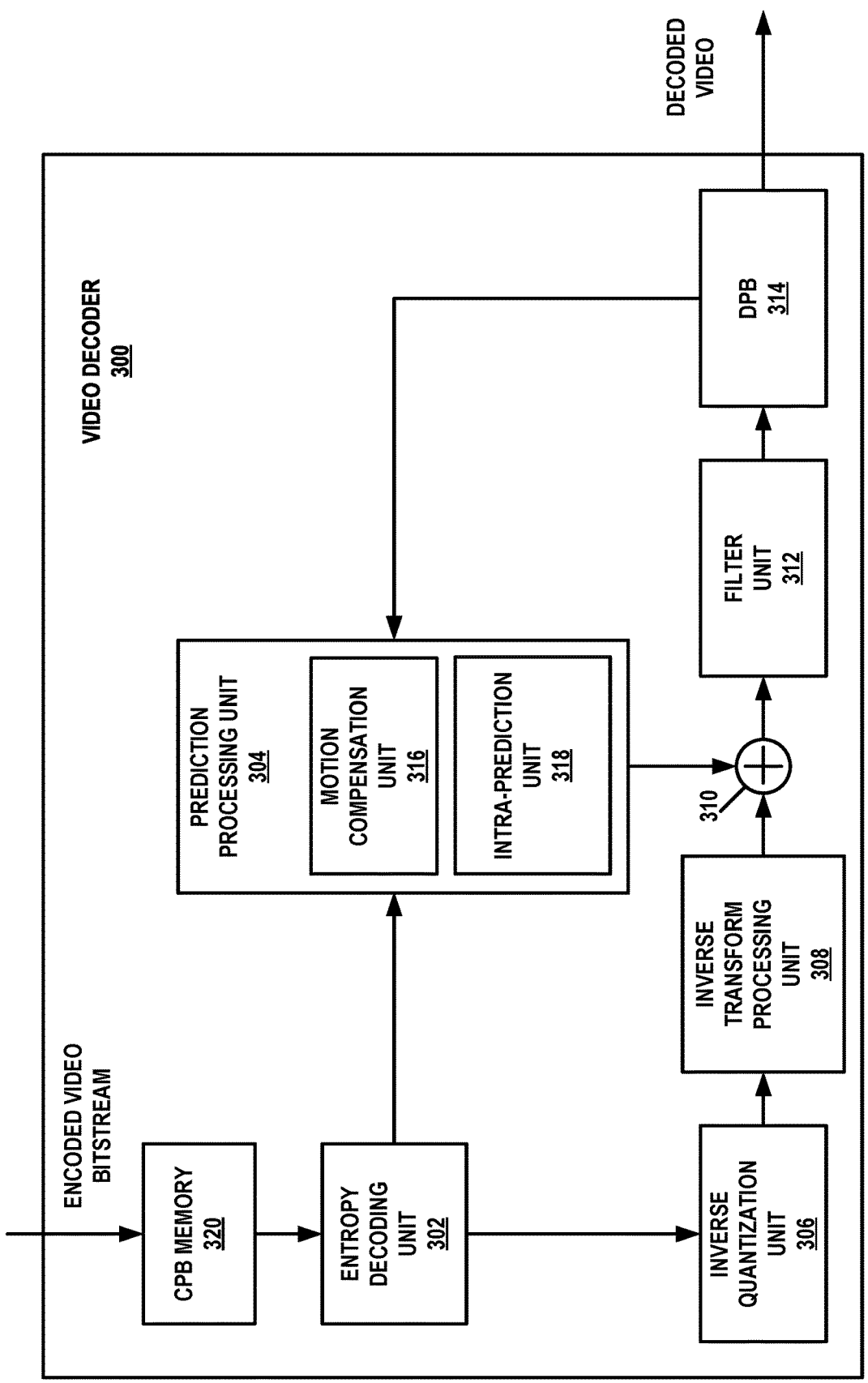
FIG. 7 is a block diagram illustrating an example video decoder that may perform the techniques of this disclosure.

FIG. 7 is a block diagram illustrating an example video decoder 300 that may perform the techniques of this disclosure. FIG. 7 is provided for purposes of explanation and is not limiting on the techniques as broadly exemplified and described in this disclosure. For purposes of explanation, this disclosure describes video decoder 300 according to the techniques of VVC (ITU-T H.266, under development), and HEVC (ITU-T H.265). However, the techniques of this disclosure may be performed by video coding devices that are configured to other video coding standards.

In the example of FIG. 7, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, of FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 7 are illustrated to assist with understanding the operations performed by video decoder 300. The units may be implemented as fixed-function circuits, programmable circuits, or a combination thereof. Similar to FIG. 6, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). In accordance with one or more techniques of this disclosure, entropy decoding unit 302 may determine, based on a color format of a picture of the video data, which context model from among a first context model and a second context model to use to determine a context increment for a syntax element that indicates a prefix of an x or y coordinate of a last significant transform coefficient of a color component of a block of the picture. Entropy decoding unit 302 may decode a bin of the syntax element by applying CABAC using a context determined based on the context increment for the syntax element. In some examples, entropy decoding unit 302 may use the first context model or the second context model to derive a context increment for a syntax element (e.g., last_sig_coeff_x_prefix or last_sig_coeff_y_prefix) that indicates a prefix of an x or y coordinate of a last significant transform coefficient of a color component of a block of a picture of the video data. Entropy decoding unit 302 may apply CABAC to a bin of the first syntax element using a context determined based on the context increment for the syntax element. Entropy decoding unit 302 may use the first context model when the color component is luma or when the color component is a chroma component and the color format is different from 4:2:0. When using the first context model, entropy decoding unit 302 may, based on a log base-2 value of a transform size of the block being less than 6, set a context offset to 3*(log 2TrafoSize−2)+((log 2TrafoSize−1)>>2) and set a context shift equal to (log 2TrafoSize+1)>>2, where log 2TrafoSize indicates the log base-2 value of the transform size. Entropy decoding unit 302 may, based on the log base-2 value of the transform size being greater than or equal to 6, set a context offset to 3*(log 2TrafoSize−2)+((log 2TrafoSize−1)>>2)+((1<<log 2TrafoSize)>>6)<<<1)+((1<<<log 2TrafoSize)>>7) and set a context shift equal to ((log 2TrafoSize+1)>>2)<<<1. Entropy decoding unit 302 may determine the context increment as (binIdx>>ctxShift)+ctxOffset, where binIdx is a bin index of a bin of an applicable syntax element, ctxShift indicates the context shift, and ctxOffset indicates the context offset. The applicable syntax element may be the first syntax element or the second syntax element.

Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 6).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 6). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including a memory configured to store video data, and one or more processing units implemented in circuitry and configured to determine, based on a chroma format indicator applicable to a block of the video data, parameters of a residual coding operation; and perform, based on the determined parameters of the residual coding operation, the residual coding operation to decode residual data for a non-luma component of the block. In some examples, the one or more processing units may be configured to use a context model for entropy encoding a prefix of a y coordinate of a last significant transform coefficient of a luma component of a block; and use the same context model for entropy decoding a prefix of a y coordinate of a last significant transform coefficient of a chroma component of the block based on a color format of the block being 4:2:2.

Figure 8:
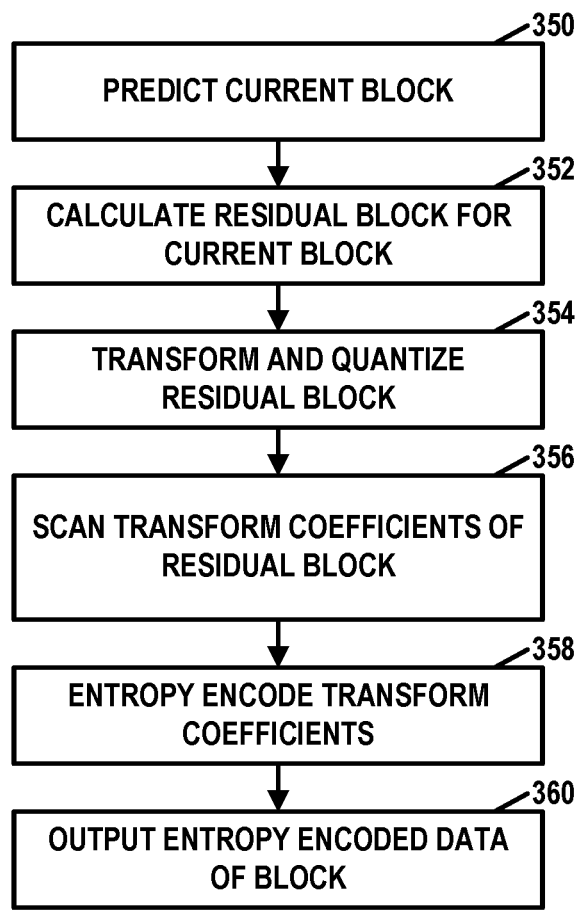
FIG. 8 is a flowchart illustrating an example method for encoding a current block.

FIG. 8 is a flowchart illustrating an example method for encoding a current block. The current block may comprise a current CU. Although described with respect to video encoder 200 (FIGS. 1 and 6), it should be understood that other devices may be configured to perform a method similar to that of FIG. 8.

In this example, video encoder 200 initially predicts the current block (350). For example, video encoder 200 may form a prediction block for the current block. Video encoder 200 may then calculate a residual block for the current block (352). To calculate the residual block, video encoder 200 may calculate a difference between the original, unencoded block and the prediction block for the current block. Video encoder 200 may then transform the residual block and quantize transform coefficients of the residual block (354). Next, video encoder 200 may scan the quantized transform coefficients of the residual block (356). During the scan, or following the scan, video encoder 200 may entropy encode the transform coefficients (358). For example, video encoder 200 may encode the transform coefficients using CAVLC or CABAC. Video encoder 200 may also entropy encode last_sig_coeff_x_prefix and last_sig_coeff_y_prefix syntax elements using contexts determined in accordance with the techniques of this disclosure. Video encoder 200 may then output the entropy encoded data of the block (360).

Figure 9:
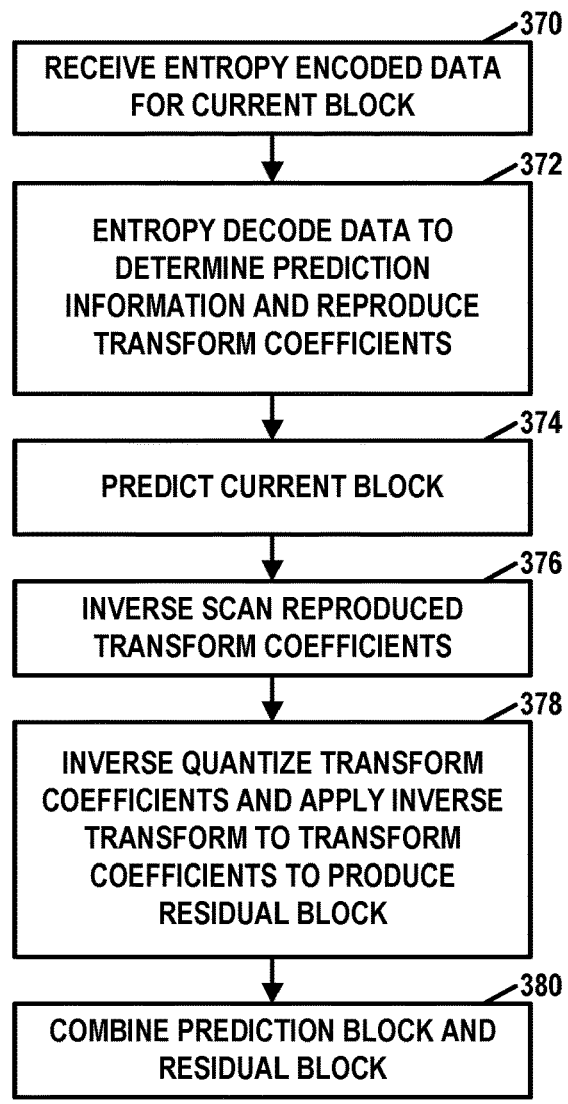
FIG. 9 is a flowchart illustrating an example method for decoding a current block of video data.

FIG. 9 is a flowchart illustrating an example method for decoding a current block of video data. The current block may comprise a current CU. Although described with respect to video decoder 300 (FIGS. 1 and 7), it should be understood that other devices may be configured to perform a method similar to that of FIG. 9.

Video decoder 300 may receive entropy encoded data for the current block, such as entropy encoded prediction information and entropy encoded data for transform coefficients of a residual block corresponding to the current block (370). Video decoder 300 may entropy decode the entropy encoded data to determine prediction information for the current block and to reproduce transform coefficients of the residual block (372). Video decoder 300 may also entropy decode last_sig_coeff_x_prefix and last_sig_coeff_y_prefix syntax elements using contexts determined in accordance with the techniques of this disclosure. Video decoder 300 may predict the current block (374), e.g., using an intra- or inter-prediction mode as indicated by the prediction information for the current block, to calculate a prediction block for the current block. Video decoder 300 may then inverse scan the reproduced transform coefficients (376), to create a block of quantized transform coefficients. Video decoder 300 may then inverse quantize the transform coefficients and apply an inverse transform to the transform coefficients to produce a residual block (378). Video decoder 300 may ultimately decode the current block by combining the prediction block and the residual block (380).

Figure 10:
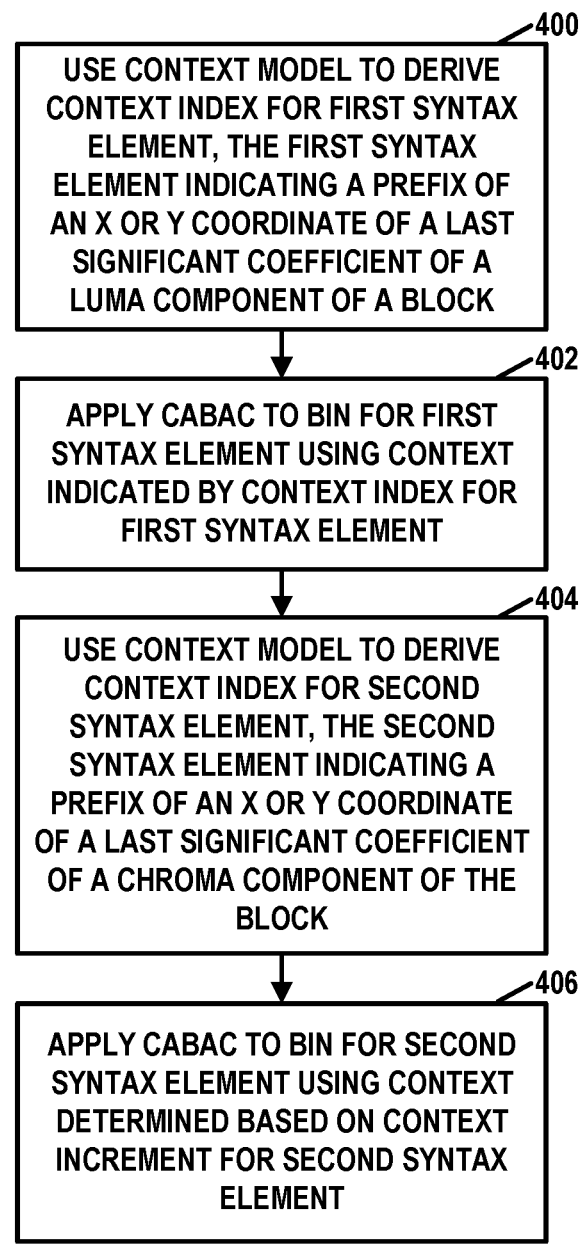
FIG. 10 is a flowchart illustrating an example operation of a video coder in accordance with one or more techniques of this disclosure.

FIG. 10 is a flowchart illustrating an example operation of a video coder in accordance with one or more techniques of this disclosure. In the example of FIG. 10, the video coder (e.g., video encoder 200 or video decoder 300) may use a context model to derive a context increment for a first syntax element (e.g., last_sig_coeff_x_prefix or last_sig_coeff_y_prefix) (400). The video coder may use the operation of FIG. 11 to derive the context increment for the first syntax element. The first syntax element may indicate a prefix of an x or y coordinate of a last significant transform coefficient of a luma component of a block of the video data. Furthermore, the video coder may apply CABAC to a bin of the first syntax element using a context determined based on the context increment for the first syntax element (402).

The video coder may use the context model to derive a context increment for a second syntax element (e.g., last_sig_coeff_x_prefix or last_sig_coeff_y_prefix) (404). The video coder may use the operation of FIG. 11 to derive the context increment for the second syntax element. The second syntax element may indicate a prefix of an x or y coordinate of a last significant transform coefficient of a chroma component of the block of a picture of the video data. The color format of the picture may be different from 4:2:0. The video coder may apply CABAC to a bin of the second syntax element using a context determined based on the context increment for the second syntax element (406).

FIG. 11 is a flowchart illustrating an example operation of video encoder 200 in accordance with one or more techniques of this disclosure. In the example of FIG. 11, video encoder 200 may determine, based on a color format of a picture of the video data, which context model from among a first context model and a second context model to use to determine a context increment for a syntax element that indicates a prefix of an x or y coordinate of a last significant transform coefficient of a color component (e.g., a first color component) of a block of the picture (440). In some examples, video encoder 200 may use the first context model to determine the context increment for a first syntax element and may make, based on the color format of the picture of the video data, a determination to use the second context model to determine a context increment for a second syntax element. Alternatively, video encoder 200 may make, based on the color format of the picture of the video data, a determination to use the (same) first context model to determine a context increment for the second syntax element. In this example, the second syntax element indicates a prefix of an x or y coordinate of a last significant transform coefficient of a second color component of the block of the picture. Furthermore, video encoder 200 may encode a bin of the second syntax element by applying CABAC using a context determined based on the context increment for the second syntax element.

In some examples, video encoder 200 may make the determination to use the second context model to determine the context increment for the second syntax element comprises, based on none of the following conditions being satisfied, making the determination to use the second context model to derive the context increment for the second syntax element: i) the color format of the picture is a monochrome color format or a 4:4:4 color format and/or ii) the color format of the picture is a 4:2:0 color format or a 4:2:2 color format and the second color component is a luma component. Additionally, in some examples, video encoder 200 may make the determination to use the second context model to determine the context increment based on the following condition not being satisfied: iii) the color format of the picture is 4:2:2, the second color component is a chroma component, and the second syntax element indicates the prefix of the y coordinate of the last significant transform coefficient of the second color component of the block. In some examples, based on at least one of the following conditions being satisfied, video encoder 200 may make a determination to use the first context model to derive the context increment for the second syntax element: i) the color format of the picture is a monochrome color format or a 4:4:4 color format, or ii) the color format of the picture is a 4:2:0 color format or a 4:2:2 color format and the second color component is a luma component. Additionally, in some examples, based on the following condition being satisfied, video encoder 200 may make a determination to use the first context model to derive the context increment for the second syntax element: iii) the color format of the picture is a 4:2:2 color format and the second color component is not the luma component, and the second syntax element indicates the prefix of the y coordinate of the last significant transform coefficient of the block. The same determination process may be applied to the first syntax element. In other words, the same conditions may be used for the first and second syntax elements. In some examples, the first and second syntax elements may be associated with different color components. In some examples, the first and second syntax elements may be associated with different coordinates of the same color component Additionally, video encoder 200 may encode a bin of the syntax element by applying CABAC using a context determined based on the context increment for the syntax element (442).

FIG. 12 is a flowchart illustrating an example operation of video decoder 300 in accordance with one or more techniques of this disclosure. In the example of FIG. 12, video decoder 300 may determine, based on a color format of a picture of the video data, which context model from among a first context model and a second context model to use to determine a context increment for a syntax element that indicates a prefix of an x or y coordinate of a last significant transform coefficient of a color component (e.g., a first color component) of a block of the picture (460). Video decoder 300 may make, based on the color format of the picture of the video data, a determination to use the second context model to determine a context increment for a second syntax element. Alternatively, video decoder 300 may make, based on the color format of the picture of the video data, a determination to use the (same) first context model to determine a context increment for the second syntax element. In this example, the second syntax element indicates a prefix of an x or y coordinate of a last significant transform coefficient of a second color component of the block of the picture. Furthermore, video encoder 200 may encode a bin of the second syntax element by applying CABAC using a context determined based on the context increment for the second syntax element.

In some examples, video decoder 300 may make the determination to use the second context model to determine the context increment for the second syntax element comprises, based on none of the following conditions being satisfied, making the determination to use the second context model to derive the context increment for the second syntax element: i) the color format of the picture is a monochrome color format or a 4:4:4 color format, and/or ii) the color format of the picture is a 4:2:0 color format or a 4:2:2 color format and the second color component is a luma component. Additionally, in some examples, based on the following condition not being satisfied, video decoder 300 may make the determination to use the second context model to derive the context model for the second syntax element iii) the color format of the picture is 4:2:2, the second color component is a chroma component, and the second syntax element indicates the prefix of the y coordinate of the last significant transform coefficient of the second color component of the block. In some examples, based on at least one of the following conditions being satisfied, video decoder 300 may make a determination to use the first context model to derive the context increment for the second syntax element: i) the color format of the picture being a monochrome color format or a 4:4:4 color format, or ii) the color format of the picture being a 4:2:0 color format or a 4:2:2 color format and the second color component being a luma component. Additionally, in some examples, based on the following condition being satisfied, video decoder 300 may make a determination to use the first context model to derive the context increment for the second syntax element: iii) the color format of the picture being a 4:2:2 color format and the second color component not being the luma component, and the second syntax element indicating the prefix of the y coordinate of the last significant transform coefficient of the block. The same determination process may be applied to the first syntax element. In other words, the same conditions may be used for the first and second syntax elements. In some examples, the first and second syntax elements may be associated with different color components. In some examples, the first and second syntax elements may be associated with different coordinates of the same color component Additionally, video decoder 300 may decode a bin of the syntax element by applying CABAC using a context determined based on the context increment for the syntax element (462).

Figure 13:
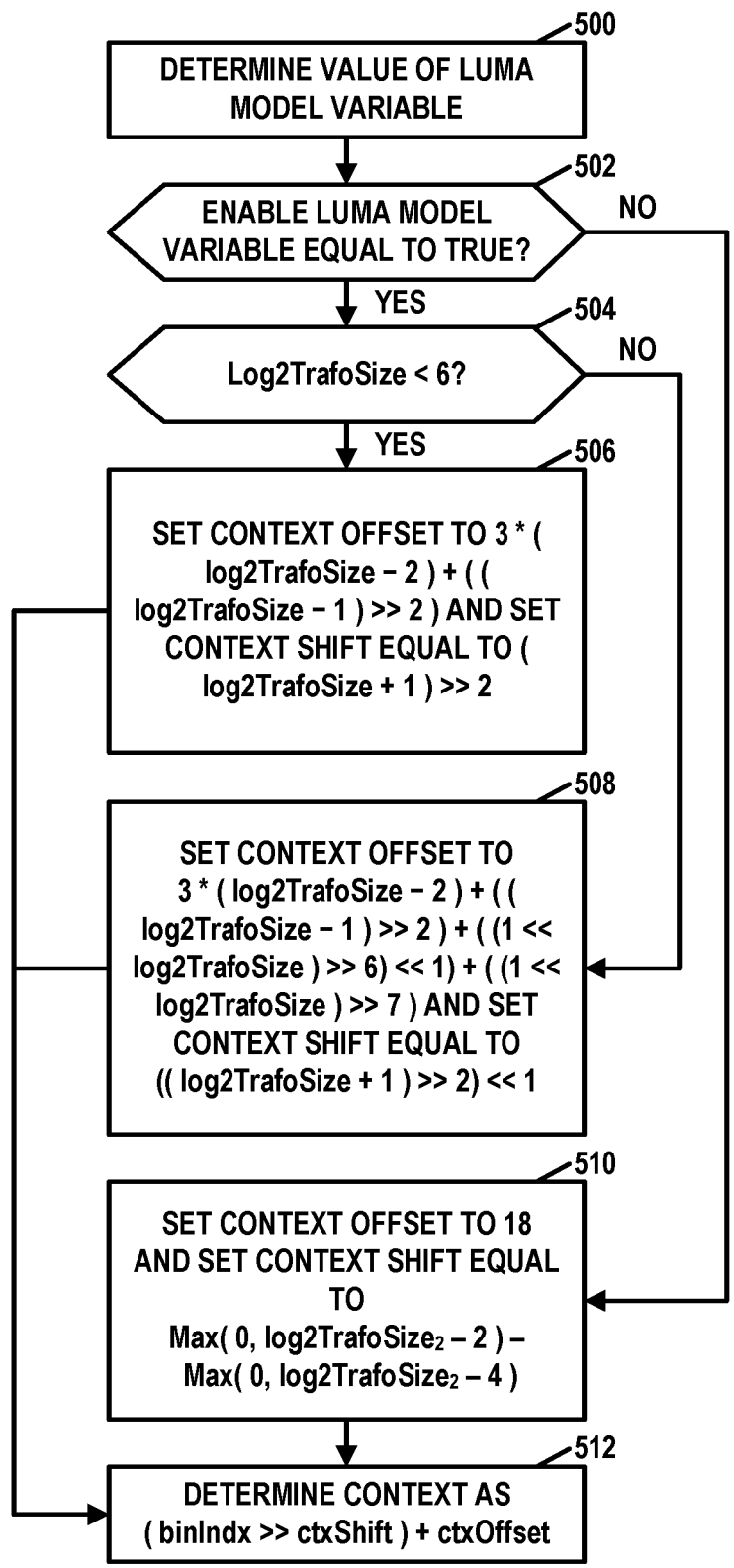
FIG. 13 is a flowchart illustrating an example operation of a video coder to determining a context in accordance with one or more techniques of this disclosure.

FIG. 13 is a flowchart illustrating an example operation of a video coder to determining a context in accordance with one or more techniques of this disclosure. In the example of FIG. 13, the video coder may determine a value of a luma model variable (e.g., enableLumaModel) (500). The video coder may use the operation of FIG. 14, described below, to determine the value of the luma model variable.

Furthermore, in the example of FIG. 13, the video coder may determine whether the luma model variable is equal to true (502). In response to determining that the luma model variable is equal to true ("YES" branch of 502), the video coder may determine whether a log base-2 value of a transform size of the block (e.g., Log 2TrafoSize) is less than 6 (504). Based on the log base-2 value of the transform size of the block being less than 6 ("YES" branch of 504), the video coder may set a context offset to 3*(log 2TrafoSize−2)+((log 2TrafoSize−1)>>2) and may set a context shift equal to (log 2TrafoSize+1)>>2. log 2TrafoSize indicates the log base-2 value of the transform size.

In response to determining that the log base-2 value of the transform size is greater than or equal to 6 ("NO" branch of 504), the video coder may set a context offset to 3*(log 2TrafoSize−2)+((log 2TrafoSize−1)>>2)+((1<<log 2TrafoSize)>>6)<<1)+((1<<log 2TrafoSize)>>7) and set a context shift equal to ((log 2TrafoSize+1)>>2)<<1 (508). log 2TrafoSize indicates the log base-2 value of the transform size.

However, in response to determining that the luma model variable is not equal to true ("NO" branch of 502), the video coder may set the context offset to 18 and set the context shift to Max(0, log 2TrafoSize−2)−Max(0, log 2TrafoSize−4) (510). Max indicates a maximum function and log 2TrafoSize indicates a log base-2 value of a transform size of the block.

In any case, after determining the context shift and the context offset in actions 506, 508, or 510, the video coder may determine a context increment as (binIdx>>ctxShift)+ctxOffset (512). where binIdx is a bin index of a bin of an applicable syntax element, ctxShift indicates the context shift, and ctxOffset indicates the context offset. The applicable syntax element may be the first syntax element or the second syntax element described with respect to FIG. 10.

Figure 14:
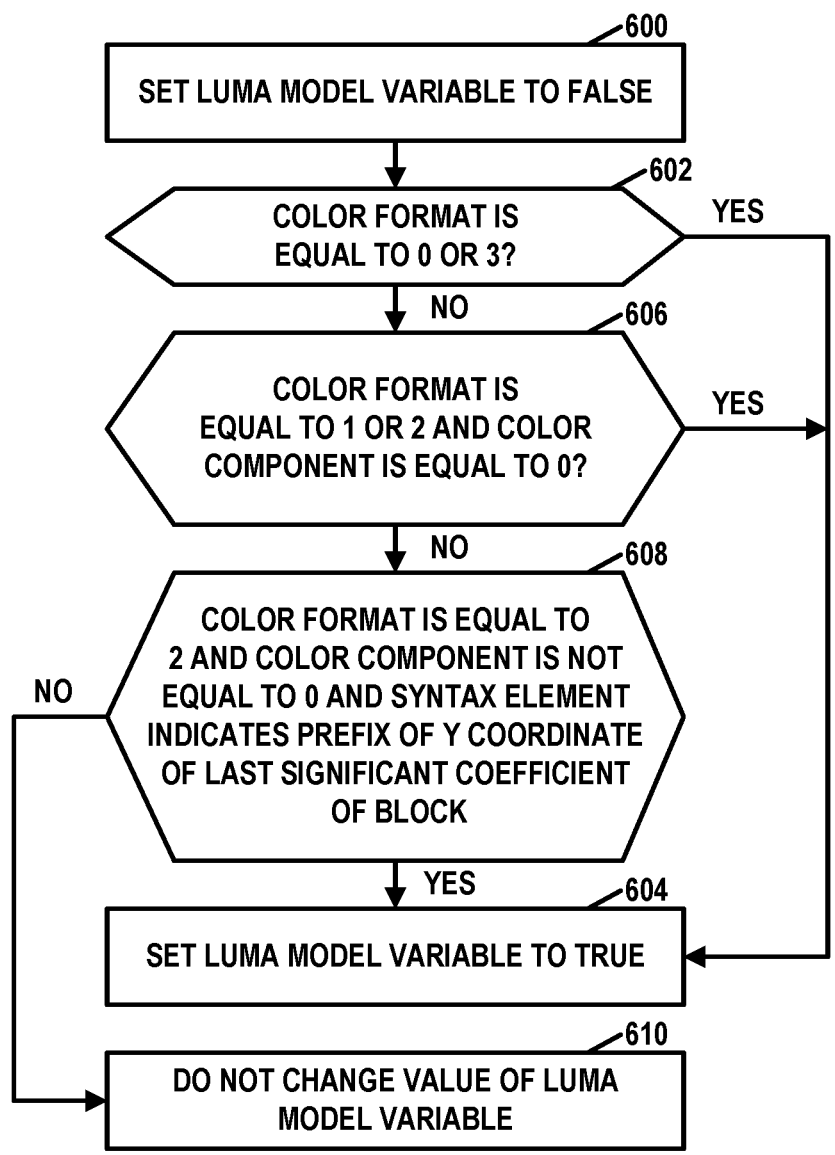
FIG. 14 is a flowchart illustrating an example operation to determine a value of a luma model variable in accordance with one or more techniques of this disclosure.

FIG. 14 is a flowchart illustrating an example operation to determine a value of a luma model variable in accordance with one or more techniques of this disclosure. In the example of FIG. 14, a video coder (e.g., video encoder 200 or video decoder 300) may initially set the luma model variable (e.g., enableLumaModel) to false (600). The video coder may then determine whether the color format is equal to 0 or 3 (602). For instance, the video coder may determine whether chromaArrayType is equal to 0 or 3. As mentioned above, a color format equal to 0 indicates monochrome and a color format equal to 3 indicates a 4:4:4 color format. If the color format is equal to 0 or 3 ("YES" branch of 602), the video coder may set the luma model variable to true (604).

Otherwise, if the color format is not equal to 0 or 3 ("NO" branch of 602), the video coder may determine whether the color format is equal to 1 or 2 and a current color component (e.g., cIdx) is equal to 0 (606). The current color component is the color component associated with the syntax element (e.g., last_sig_coeff_x_prefix or last_sig_coeff_y_prefix) being coded. As mentioned above, a color format equal to 1 indicates a 4:2:0 color format and a color format equal to 2 indicates a 4:2:2 color format. If the color format is equal to 1 or 2 and the color component is equal to 0 ("YES" branch of 606), the video coder may set the luma model variable to true (604).

Otherwise, if the color format is not equal to 1 or 2 or the current color component is not equal to 0 ("NO" branch of 606), the video coder may determine whether the color format is equal to 2 and the current color component is not equal to 0 and the syntax element (e.g., last_sig_coeff_y_prefix) indicates a prefix of a y coordinate of the last significant transform coefficient of the block (608). In response to determining the color format is equal to 2 and the current color component is not equal to 0 and the syntax element indicates a prefix of a y coordinate of the last significant transform coefficient of the block ("YES" branch of 608), the video coder may set the luma model variable to true (604). Otherwise, if the color format is not equal to 2 or the current color component is equal to 0 or the syntax element does not indicate a prefix of a y coordinate of the last significant transform coefficient of the block ("NO" branch of 608), the video coder does not change the value of the luma model variable (610). In some examples, decision block 608 may be omitted.

The following is a non-limiting list of aspects that are in accordance with one or more techniques of this disclosure.

Aspect 1A. A method of coding video data, the method comprising: determining, based on a chroma format indicator applicable to a block of the video data, parameters of a residual coding operation; and performing, based on the determined parameters of the residual coding operation, the residual coding operation to code residual data for a non-luma component of the block.

Aspect 2A. A method of coding video data, the method comprising: using a context model for entropy coding a prefix of a y coordinate of a last significant coefficient of a luma component of a block; and using the same context model for entropy coding a prefix of a y coordinate of a last significant coefficient of a chroma component of the block based on a color format of the block being 4:2:2.

Aspect 3A. The method of aspect 2A, further comprising the method of aspect 1.

Aspect 4A. The method of any of aspects 1A-3A, wherein coding comprises decoding.

Aspect 5A. The method of any of aspects 1A-4A, wherein coding comprises encoding.

Aspect 6A. A device for coding video data, the device comprising one or more means for performing the method of any of aspects 1A-5A.

Aspect 7A. The device of aspect 6A, wherein the one or more means comprise one or more processors implemented in circuitry.

Aspect 8A. The device of any of aspects 6A and 7A, further comprising a memory configured to store the video data.

Aspect 9A. The device of any of aspects 6A-8A, further comprising a display configured to display decoded video data.

Aspect 10A. The device of any of aspects 6A-9A, wherein the device comprises one or more of a camera, a computer, a mobile device, a broadcast receiver device, or a set-top box.

Aspect 11A. The device of any of aspects 6A-10A, wherein the device comprises a video decoder.

Aspect 12A. The device of any of aspects 6A-11A, wherein the device comprises a video encoder.

Aspect 13A. A computer-readable storage medium having stored thereon instructions that, when executed, cause one or more processors to perform the method of any of aspects 1A-5A.

Aspect 1B. A method of coding video data, the method comprising: using a context model to derive a context increment for a first syntax element, wherein the first syntax element indicates a prefix of an x or y coordinate of a last significant transform coefficient of a luma component of a block of a picture of the video data; applying context-adaptive binary arithmetic coding (CABAC) to a bin of the first syntax element using a context determined based on the context increment for the first syntax element; using the context model to derive a context increment for a second syntax element, wherein the second syntax element indicates a prefix of an x or y coordinate of a last significant transform coefficient of a chroma component of the block, and a color format of the picture is different from 4:2:0; and applying CABAC to a bin of the second syntax element using a context determined based on the context increment for the second syntax element, wherein using the context model comprises: performing one of: based on a log base-2 value of a transform size of the block being less than 6, setting a context offset to 3*(log 2TrafoSize−2)+((log 2TrafoSize−1)>>2) and setting a context shift equal to (log 2TrafoSize+1)>>2, where log 2TrafoSize indicates the log base-2 value of the transform size, or based on the log base-2 value of the transform size being greater than or equal to 6, setting a context offset to 3*(log 2TrafoSize−2)+((log 2TrafoSize−1)>>2)+((1<<log 2TrafoSize)>>6)<<<1)+((1<<<log 2TrafoSize)>>7) and setting the context shift equal to ((log 2TrafoSize+1)>>2)<<<1; and determining a context increment as (binIdx>>ctxShift)+ctxOffset, where binIdx is a bin index of a bin of an applicable syntax element, ctxShift indicates the context shift, and ctxOffset indicates the context offset, wherein the applicable syntax element is the first syntax element or the second syntax element.

Aspect 2B. The method of aspect 1B, further comprising setting an enable luma model variable from false to true based on one of: the color format of the picture being monochrome or 4:4:4, or the color format of the picture being 4:2:0 or 4:2:2 and a color component of the applicable syntax element being luma, or wherein using the context model to derive the context increment for the second syntax element comprises using the context model to derive the context increment for the second syntax element based on the enable luma model variable being equal to true.

Aspect 3B. The method of aspect 2B, further comprising setting the enable luma model variable from false to true based on the color format of the picture being 4:2:2, the color component of the applicable syntax element is the chroma component, and the applicable syntax element indicates the prefix of the y coordinate of the last significant transform coefficient of the chroma component of the block.

Aspect 4B. The method of aspect 1B, wherein the context model is a first context model, the picture is a first picture, the block is a first block, the applicable syntax element is a first applicable syntax element, the context is a first context, the context shift is a first context shift, and the context offset is a first context offset, and wherein the method further comprises: setting an enable luma model variable from false to true based on one of: the color format of a second picture being monochrome or 4:4:4, or the color format of the second picture being 4:2:0 or 4:2:2 and a color component of a second applicable syntax element being luma, or based on the enable luma model variable being equal to false, using a second context model to derive a context increment for the second applicable syntax element, wherein using the second context model to derive the context increment for the second applicable syntax element comprises: setting a second context offset to 18 and setting a second context shift to Max(0, log 2TrafoSize$_2$−2)−Max(0, log 2TrafoSize$_2$−4), where Max indicates a maximum function and log 2TrafoSize$_2$ indicates a log base-2 value of a transform size of the second block; and determining a second context increment as (binIdx$_2$>>ctxShift$_2$)+ctxOffset$_2$, where binIdx$_2$ is a bin index of a bin of the second applicable syntax element, ctxShift$_2$ indicates the second context shift, and ctxOffset$_2$ indicates the second context offset.

Aspect 5B. The method of aspect 4B, wherein the method further comprises setting the enable luma model variable from false to true based on the color format of the second picture being 4:2:2, the color component of the second applicable syntax element is a chroma component of a second block of the second picture, and the second applicable syntax element indicates the prefix of the y coordinate of a last significant transform coefficient of the chroma component of the second block.

Aspect 6B. The method of aspect 1B, wherein applying CABAC to the bin of the first syntax element comprises CABAC decoding the bin of the first syntax element, and wherein applying CABAC to the bin of the second syntax element comprises CABAC decoding the bin of the second syntax element.

Aspect 7B. The method of aspect 1B, wherein applying CABAC to the bin of the first syntax element comprises CABAC encoding the bin of the first syntax element, and wherein applying CABAC to the bin of the second syntax element comprises CABAC encoding the bin of the second syntax element.

Aspect 8B. A device for coding video data, the device comprising: a memory configured to store the video data; and one or more processors coupled to the memory, the one or more processors implemented in circuitry and configured to: use a context model to derive a context increment for a first syntax element, wherein the first syntax element indicates a prefix of an x or y coordinate of a last significant transform coefficient of a luma component of a block of the video data; apply context-adaptive binary arithmetic coding (CABAC) to a bin of the first syntax element using a context determined based on the context increment for the first syntax element; use the context model to derive a context increment for a second syntax element, wherein the second syntax element indicates a prefix of an x or y coordinate of a last significant transform coefficient of a chroma component of the block, and the color format of the picture is different from 4:2:0; and apply CABAC to a bin of the second syntax element using a context determined based on the context increment for the second syntax element, wherein the one or more processors are configured to, as part of using the context model: based on a log base-2 value of a transform size of the block being less than 6, set a context offset to 3*(log 2TrafoSize−2)+((log 2TrafoSize−1)>>2) and set a context shift equal to (log 2TrafoSize+1)>>2, where log 2TrafoSize indicates the log base-2 value of the transform size; based on the log base-2 value of the transform size being greater than or equal to 6, set a context offset to 3*(log 2TrafoSize−2)+log 2TrafoSize−1)>>2)+((1<<log 2TrafoSize)>>6)<<<1)+((1<<<log 2TrafoSize)>>7) and set a context shift equal to ((log 2TrafoSize+1)>>2)<<<1; and determine a context increment as (binIdx>>ctxShift)+ctxOffset, where binIdx is a bin index of a bin of an applicable syntax element, ctxShift indicates the context shift, and ctxOffset indicates the context offset, wherein the applicable syntax element is the first syntax element or the second syntax element.

Aspect 9B. The device of aspect 8B, wherein the one or more processors are further configured to set an enable luma model variable from false to true based on one of: the color format of the picture being monochrome or 4:4:4, or the color format of the picture being 4:2:0 or 4:2:2 and a color component of the applicable syntax element being luma; and wherein the one or more processors are configured to, as part of using the context model to derive the context increment for the second syntax element, use the context model to derive the context increment for the second syntax element based on the enable luma model variable being equal to true.

Aspect 10B. The device of aspect 9B, wherein the one or more processors are further configured to set an enable luma model variable from false to true based on the color format of the picture being 4:2:2, the color component of the applicable syntax element is the chroma component, and the applicable syntax element indicates the prefix of the y coordinate of the last significant transform coefficient of the chroma component of the block.

Aspect 11B. The device of aspect 9B, wherein the one or more processors are configured to, based on the enable luma model variable being equal to false, use a second context model to derive the context increment for the second applicable syntax element, wherein the one or more processors are configured to, as part of using the second context model to derive the context increment for the second applicable syntax element: set a second context offset to 18 and setting a second context shift to Max(0, log 2TrafoSize$_2$−2)−Max(0, log 2TrafoSize$_2$−4), where Max indicates a maximum function and log 2TrafoSize$_2$ indicates a log base-2 value of a transform size of the second block; and determine a second context increment as (binIdx$_2$>>ctxShift$_2$)+ctxOffset$_2$, where binIdx$_2$ is a bin index of a bin of the second applicable syntax element, ctxShift$_2$ indicates the second context shift, and ctxOffset$_2$ indicates the second context offset.

Aspect 12B. The device of aspect 8B, wherein the one or more processors are configured to, as part of applying CABAC to the bin of the first syntax element, CABAC decode the bin of the first syntax element, and wherein the one or more processors are configured to, as part of applying CABAC to the bin of the second syntax element, CABAC decode the bin of the second syntax element.

Aspect 13B. The device of aspect 8B, wherein the one or more processors are configured to, as part of applying CABAC to the bin of the first syntax element, CABAC encode the bin of the first syntax element, and wherein the one or more processors are configured to, as part of applying CABAC to the bin of the second syntax element, CABAC encode the bin of the second syntax element.

Aspect 14B. The device of aspect 8B, further comprising a display configured to display decoded video data.

Aspect 15B. The device of aspect 8B, wherein the device comprises one or more of a camera, a computer, a mobile device, a broadcast receiver device, or a set-top box.

Aspect 16B. A device for coding video data, the device comprising: means for using a context model to derive a context increment for a first syntax element, wherein the first syntax element indicates a prefix of an x or y coordinate of a last significant transform coefficient of a luma component of a block of the video data; means for applying context-adaptive binary arithmetic coding (CABAC) to a bin of the first syntax element using a context determined based on the context increment for the first syntax element; means for using the context model to derive a context increment for a second syntax element, wherein the second syntax element indicates a prefix of an x or y coordinate of a last significant transform coefficient of a chroma component of the block, and the color format of the picture is different from 4:2:0; and means for applying CABAC to a bin of the second syntax element using a context determined based on the context increment for the second syntax element, wherein the means for using the context model comprises: means for setting, based on a log base-2 value of a transform size of the block being less than 6, setting a context offset to 3*(log 2TrafoSize−2)+((log 2TrafoSize−1)>>2) and setting a context shift equal to (log 2TrafoSize+1)>>2, where log 2TrafoSize indicates the log base-2 value of the transform size; means for setting, based on the log base-2 value of the transform size being greater than or equal to 6, a context offset to 3*(log 2TrafoSize−2)+log 2TrafoSize−1)>>2)+((1<<log 2TrafoSize)>>6)<<<1)+((1<<<log 2TrafoSize)>>7) and setting the context shift equal to ((log 2TrafoSize+1)>>2)<<<1; and means for determining a context increment as (binIdx>>ctxShift)+ctxOffset, where binIdx is a bin index of a bin of an applicable syntax element, ctxShift indicates the context shift, and ctxOffset indicates the context offset, wherein the applicable syntax element is the first syntax element or the second syntax element.

Aspect 17B. The device of aspect 16B, wherein the device further comprises means for setting an enable luma model variable from false to true based on one of: the color format of the picture being monochrome or 4:4:4, or the color format of the picture being 4:2:0 or 4:2:2 and a color component of the applicable syntax element being luma, or wherein the means for using the context model to derive the context increment for the second syntax element comprises means for using the context model to derive the context increment for the second syntax element based on the enable luma model variable being equal to true.

Aspect 18B. The device of aspect 17B, further comprising means for using, based on the enable luma model variable being equal to false, a second context model to derive the context increment for the second applicable syntax element, wherein the means for using the second context model to derive the context increment for the second applicable syntax element comprise: means for setting a second context offset to 18 and setting a second context shift to Max(0, log 2TrafoSize$_2$−2)−Max(0, log 2TrafoSize$_2$−4), where Max indicates a maximum function and log 2TrafoSize$_2$ indicates a log base-2 value of a transform size of the second block; and means for determining a second context increment as (binIdx$_2$>>ctxShift$_2$)+ctxOffset$_2$, where binIdx$_2$ is a bin index of a bin of the second applicable syntax element, ctxShift$_2$ indicates the second context shift, and ctxOffset$_2$ indicates the second context offset.

Aspect 19B. A computer-readable storage medium having stored thereon instructions that, when executed, cause one or more processors to: use a context model to derive a context increment for a first syntax element, wherein the first syntax element indicates a prefix of an x or y coordinate of a last significant transform coefficient of a luma component of a block of the video data; apply context-adaptive binary arithmetic coding (CABAC) to a bin of the first syntax element using a context determined based on the context increment for the first syntax element; use the context model to derive a context increment for a second syntax element, wherein the second syntax element indicates a prefix of an x or y coordinate of a last significant transform coefficient of a chroma component of the block, and the color format of the picture is different from 4:2:0; and apply CABAC to a bin of the second syntax element using a context determined based on the context increment for the second syntax element, wherein the instructions that cause the one or more processors to use the context model comprise instructions that, when executed, cause the one or more processors to: based on a log base-2 value of a transform size of the block being less than 6, set a context offset to 3*(log 2TrafoSize−2)+((log 2TrafoSize−1)>>2) and setting a context shift equal to (log 2TrafoSize+1)>>2, where log 2TrafoSize indicates the log base-2 value of the transform size; based on the log base-2 value of the transform size being greater than or equal to 6, set a context offset to 3*(log 2TrafoSize−2)+((log 2TrafoSize−1)>>2)+((1<<log 2TrafoSize)>>6)<<<1)+ ((1<<<log 2TrafoSize)>>7) and setting the context shift equal to ((log 2TrafoSize+1)>>2)<<<1; and determine a context increment as (binIdx>>ctxShift)+ctxOffset, where binIdx is a bin index of a bin of an applicable syntax element, ctxShift indicates the context shift, and ctxOffset indicates the context offset, wherein the applicable syntax element is the first syntax element or the second syntax element.

Aspect 1C: A method of decoding video data includes determining, based on a color format of a picture of the video data, which context model from among a first context model and a second context model to use to determine a context increment for a syntax element that indicates a prefix of an x or y coordinate of a last significant transform coefficient of a color component of a block of the picture; and decoding a bin of the syntax element by applying Context Adaptive Binary Arithmetic Coding (CABAC) using a context determined based on the context increment for the syntax element.

Aspect 2C: The method of aspect 1C, wherein: the color component is a first color component and the syntax element is a first syntax element, and the method further comprises: using the first context model to determine the context increment for the first syntax element; making, based on the color format of the picture of the video data, a determination to use the first context model to determine a context increment for a second syntax element, wherein the second syntax element indicates a prefix of an x or y coordinate of a last significant transform coefficient of a second color component of the block of the picture; and decoding a bin of the second syntax element by applying CABAC using a context determined based on the context increment for the second syntax element.

Aspect 3C: The method of aspect 1C, wherein: the color component is a first color component and the syntax element is a first syntax element, and the method further comprises: using the first context model to determine the context increment for the first syntax element; making, based on the color format of the picture of the video data, a determination to use the second context model to determine a context increment for a second syntax element, wherein the second syntax element indicates a prefix of an x or y coordinate of a last significant transform coefficient of a second color component of the block of the picture; and decoding a bin of the second syntax element by applying CABAC using a context determined based on the context increment for the second syntax element.

Aspect 4C: The method of aspect 2C or 3C, wherein the first color component is a luma component and the second color component is a chroma component.

Aspect 5C: The method of any of aspects 3C and 4C, wherein making the determination to use the second context model to determine the context increment for the second syntax element comprises, based on none of the following conditions being satisfied, making the determination to use the second context model to derive the context increment for the second syntax element: i) the color format of the picture is a monochrome color format or a 4:4:4 color format, and ii) the color format of the picture is a 4:2:0 color format or a 4:2:2 color format and the second color component is a luma component.

Aspect 6C: The method of aspect 5C, wherein making the determination to use the second context model to determine the context increment for the second syntax element further based on the following condition not being satisfied: iii) the color format of the picture being 4:2:2, the second color component being a chroma component, and the second syntax element indicating the prefix of the y coordinate of the last significant transform coefficient of the second color component of the block.

Aspect 7C: The method of any of aspects 3C through 6C, wherein using the first context model to derive the context increment for the first syntax element comprises: performing one of: based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or based on the log base-2 value of the transform size being greater than or equal to 6, setting the context offset ctxOffset for the first syntax element to 3*(log 2TrafoSize−2)+((log 2TrafoSize−1)>>2)+((1<<log 2TrafoSize)>>6)<<<1)+((1<<<log 2TrafoSize)>>7) and setting the context shift ctxShift for the first syntax element equal to ((log 2TrafoSize+1)>>2)<<<1; and determining the context increment for the first syntax element as (binIdx>>ctxShift)+ctxOffset, where binIdx is a bin index of a bin of the first syntax element.

Aspect 8C: The method of any of aspects 3C through 7C, wherein using the second context model to determine a context increment for a second syntax element comprises: setting a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and determining the context increment for the second syntax element as (binIdx>>ctxShift)+ctxOffset, where binIdx is a bin index of a bin of the second syntax element.

Aspect 9C: The method of any of aspects 1C through 8C, wherein determining which context model from among the first context model and the second context model to use to determine the context increment for the syntax element comprises, based on at least one of the following conditions being satisfied, making a determination to use the first context model to derive the context increment for the syntax element: i) the color format of the picture being a monochrome color format or a 4:4:4 color format, ii) the color format of the picture being a 4:2:0 color format or a 4:2:2 color format and the color component being a luma component; or iii) the color format of the picture being a 4:2:2 color format and the color component not being the luma component, and the syntax element indicating the prefix of the y coordinate of the last significant transform coefficient of the color component of the block.

Aspect 10C: A method of encoding video data includes determining, based on a color format of a picture of the video data, which context model from among a first context model and a second context model to use to determine a context increment for a syntax element that indicates a prefix of an x or y coordinate of a last significant transform coefficient of a color component of a block of the picture; and encoding a bin of the syntax element by applying Context Adaptive Binary Arithmetic Coding (CABAC) using a context determined based on the context increment for the syntax element.

Aspect 11C: The method of aspect 10C, wherein: the color component is a first color component and the syntax element is a first syntax element, and the method further comprises: using the first context model to determine the context increment for the first syntax element; making, based on the color format of the picture of the video data, a determination to use the first context model to determine a context increment for a second syntax element, wherein the second syntax element indicates a prefix of an x or y coordinate of a last significant transform coefficient of a second color component of the block of the picture; and encoding a bin of the second syntax element by applying CABAC using a context determined based on the context increment for the second syntax element.

Aspect 12C: The method of aspect 10C, wherein: the color component is a first color component and the syntax element is a first syntax element, and the method further comprises: using the first context model to determine the context increment for the first syntax element; making, based on the color format of the picture of the video data, a determination to use the second context model to determine a context increment for a second syntax element, wherein the second syntax element indicates a prefix of an x or y coordinate of a last significant transform coefficient of a second color component of the block of the picture; and encoding a bin of the second syntax element by applying CABAC using a context determined based on the context increment for the second syntax element.

Aspect 13C: The method of aspect 11C or 12C, wherein the first color component is a luma component and the second color component is a chroma component.

Aspect 14C: The method of any of aspects 12C and 13C, wherein making the determination to use the second context model to determine the context increment for the second syntax element comprises, based on none of the following conditions being satisfied, making the determination to use the second context model to derive the context increment for the second syntax element: i) the color format of the picture is a monochrome color format or a 4:4:4 color format, and ii) the color format of the picture is a 4:2:0 color format or a 4:2:2 color format and the second color component is a luma component.

Aspect 15C: The method of any of aspects 12C through 14C, wherein making the determination to use the second context model to determine the context increment for the second syntax element further based on the following condition not being satisfied: iii) the color format of the picture being 4:2:2, the second color component being a chroma component, and the second syntax element indicating the prefix of the y coordinate of the last significant transform coefficient of the second color component of the block.

Aspect 16C: The method of any of aspects 12C through 15C, wherein using the first context model to derive the context increment for the first syntax element comprises: performing one of: based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or based on the log base-2 value of the transform size being greater than or equal to 6, setting the context offset ctxOffset for the first syntax element to 3*(log 2TrafoSize−2)+((log 2TrafoSize−1)>>2)+((1<<log 2TrafoSize)>>6)<<<1)+((1<<<log 2TrafoSize)>>7) and setting the context shift ctxShift for the first syntax element equal to ((log 2TrafoSize+1)>>2)<<1; and determining the context increment for the first syntax element as (binIdx>>ctxShift)+ctxOffset, where binIdx is a bin index of a bin of the first syntax element.

Aspect 17C: The method of any of aspects 12C through 16C, wherein using the second context model to derive the context increment for the second syntax element comprises: setting a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and determining the context increment for the second syntax element as (binIdx>>ctxShift)+ctxOffset, where binIdx is a bin index of a bin of the second syntax element.

Aspect 18C: The method of any of aspects 10C through 17C, wherein determining which context model from among the first context model and the second context model to use to determine the context increment for the syntax element comprises, based on at least one of the following conditions being satisfied, making a determination to use the first context model to derive the context increment for the syntax element: i) the color format of the picture being a monochrome color format or a 4:4:4 color format, ii) the color format of the picture being a 4:2:0 color format or a 4:2:2 color format and the color component being a luma component; or iii) the color format of the picture being a 4:2:2 color format and the color component not being the luma component, and the syntax element indicating the prefix of the y coordinate of the last significant transform coefficient of the color component of the block.

Aspect 19C: A device for decoding video data includes a memory configured to store the video data; and one or more processors coupled to the memory, the one or more processors implemented in circuitry and configured to: determine, based on a color format of a picture of the video data, which context model from among a first context model and a second context model to use to determine a context increment for a syntax element that indicates a prefix of an x or y coordinate of a last significant transform coefficient of a color component of a block of the picture; and decode a bin of the syntax element by applying Context Adaptive Binary Arithmetic Coding (CABAC) using a context determined based on the context increment for the syntax element.

Aspect 20C: The device of aspect 19C, wherein: the color component is a first color component and the syntax element is a first syntax element, and the one or more processors are further configured to: use the first context model to determine the context increment for the first syntax element; make, based on the color format of the picture of the video data, a determination to use the first context model to determine a context increment for a second syntax element, wherein the second syntax element indicates a prefix of an x or y coordinate of a last significant transform coefficient of a second color component of the block of the picture; and decode a bin of the second syntax element by applying CABAC using a context determined based on the context increment for the second syntax element.

Aspect 21C: The device of any of aspects 19C and 20C, wherein: the color component is a first color component and the syntax element is a first syntax element, and the one or more processors are further configured to: use the first context model to determine the context increment for the first syntax element; make, based on the color format of the picture of the video data, a determination to use the second context model to determine a context increment for a second syntax element, wherein the second syntax element indicates a prefix of an x or y coordinate of a last significant transform coefficient of a second color component of the block of the picture; and decode a bin of the second syntax element by applying CABAC using a context determined based on the context increment for the second syntax element.

Aspect 22C: The device of aspect 20C or 21C, wherein the first color component is a luma component and the second color component is a chroma component.

Aspect 23C: The device of any of aspects 21C and 22C, wherein the one or more processors are configured to make the determination to use the second context model to determine the context increment for the second syntax element comprises, based on none of the following conditions being satisfied, making the determination to use the second context model to derive the context increment for the second syntax element: i) the color format of the picture is a monochrome color format or a 4:4:4 color format, and ii) the color format of the picture is a 4:2:0 color format or a 4:2:2 color format and the second color component is a luma component.

Aspect 24C: The device of aspect 23C, wherein the one or more processors are configured to make the determination to use the second context model to determine the context increment for the second syntax element based on the following condition not being satisfied: iii) the color format of the picture being 4:2:2, the second color component being a chroma component, and the second syntax element indicating the prefix of the y coordinate of the last significant transform coefficient of the second color component of the block.

Aspect 25C: The device of any of aspects 19C through 24C, wherein the one or more processors are configured to, as part of using the first context model to derive the context increment for the first syntax element: perform one of: based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or based on the log base-2 value of the transform size being greater than or equal to 6, setting the context offset ctxOffset for the first syntax element to 3*(log 2TrafoSize−2)+((log 2TrafoSize−1)>>2)+((1<<<log 2TrafoSize)>>6)<<<1)+((1<<<log 2TrafoSize)>>7) and setting the context shift ctxShift for the first syntax element equal to ((log 2TrafoSize+1)>>2)<<1; and determine the context increment for the first syntax element as (binIdx>>ctxShift)+ctxOffset, where binIdx is a bin index of a bin of the first syntax element.

Aspect 26C: The device of any of aspects 21C through 25C, wherein the one or more processors are configured to, as part of using the second context model to determine a context increment for a second syntax element: set a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and determine the context increment for the second syntax element as (binIdx>>ctxShift)+ctxOffset, where binIdx is a bin index of a bin of the second syntax element.

Aspect 27C: The device of any of aspects 21C through 26C, wherein the one or more processors are configured to, as part of determining which context model from among the first context model and the second context model to use to determine the context increment for the syntax element, based on at least one of the following conditions being satisfied, make a determination to use the first context model to derive the context increment for the syntax element: i) the color format of the picture being a monochrome color format or a 4:4:4 color format, ii) the color format of the picture being a 4:2:0 color format or a 4:2:2 color format and the color component being a luma component; or iii) the color format of the picture being a 4:2:2 color format and the color component not being the luma component, and the syntax element indicating the prefix of the y coordinate of the last significant transform coefficient of the color component of the block.

Aspect 28C: The device of any of aspects 19C through 27C, further comprising a display configured to display decoded video data.

Aspect 29C: The device of any of aspects 19C through 28C, wherein the device comprises one or more of a camera, a computer, a mobile device, a broadcast receiver device, or a set-top box.

Aspect 30C: A device for encoding video data includes a memory configured to store the video data; and one or more processors coupled to the memory, the one or more processors implemented in circuitry and configured to: determine, based on a color format of a picture of the video data, which context model from among a first context model and a second context model to use to determine a context increment for a syntax element that indicates a prefix of an x or y coordinate of a last significant transform coefficient of a color component of a block of the picture; and encode a bin of the syntax element by applying Context Adaptive Binary Arithmetic Coding (CABAC) using a context determined based on the context increment for the syntax element.

Aspect 31C: The device of aspect 30C, wherein: the color component is a first color component and the syntax element is a first syntax element, and the one or more processors are further configured to: use the first context model to determine the context increment for the first syntax element; make, based on the color format of the picture of the video data, a determination to use the first context model to determine a context increment for a second syntax element, wherein the second syntax element indicates a prefix of an x or y coordinate of a last significant transform coefficient of a second color component of the block of the picture; and decode a bin of the second syntax element by applying CABAC using a context determined based on the context increment for the second syntax element.

Aspect 32C: The device of aspect 30C, wherein: the color component is a first color component and the syntax element is a first syntax element, and the one or more processors are further configured to: use the first context model to determine the context increment for the first syntax element; make, based on the color format of the picture of the video data, a determination to use the second context model to determine a context increment for a second syntax element, wherein the second syntax element indicates a prefix of an x or y coordinate of a last significant transform coefficient of a second color component of the block of the picture; and encode a bin of the second syntax element by applying CABAC using a context determined based on the context increment for the second syntax element.

Aspect 33C: The device of aspect 31C or 32C, wherein the first color component is a luma component and the second color component is a chroma component.

Aspect 34C: The device of any of aspects 32C through 33C, wherein the one or more processors are configured to make the determination to use the second context model to determine the context increment for the second syntax element comprises, based on none of the following conditions being satisfied, making the determination to use the second context model to derive the context increment for the second syntax element: i) the color format of the picture is a monochrome color format or a 4:4:4 color format, and ii) the color format of the picture is a 4:2:0 color format or a 4:2:2 color format and the second color component is a luma component.

Aspect 35C: The device of aspect 34C, wherein the one or more processors are configured to make the determination to use the second context model to determine the context increment for the second syntax element based on the following condition not being satisfied: iii) the color format of the picture being 4:2:2, the second color component being a chroma component, and the second syntax element indicating the prefix of the y coordinate of the last significant transform coefficient of the second color component of the block.

Aspect 36C: The device of any of aspects 32C through 35C, wherein the one or more processors are configured to, as part of using the first context model to derive the context increment for the first syntax element: perform one of: based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or based on the log base-2 value of the transform size being greater than or equal to 6, setting the context offset ctxOffset for the first syntax element to 3*(log 2TrafoSize−2)+((log 2TrafoSize−1)>>2)+((1<<<log 2TrafoSize)>>6)<<<1)+((1<<<log 2TrafoSize)>>7) and setting the context shift ctxShift for the first syntax element equal to ((log 2TrafoSize+1)>>2)<<1; and determine the context increment for the first syntax element as (binIdx>>ctxShift)+ctxOffset, where binIdx is a bin index of a bin of the first syntax element.

Aspect 37C: The device of any of aspects 32C through 36C, wherein the one or more processors are configured to, as part of using the second context model to determine a context increment for the second syntax element: set a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and determine the context increment for the second syntax element as (binIdx>>ctxShift)+ctxOffset, where binIdx is a bin index of a bin of the second syntax element.

Aspect 38C: The device of any of aspects 30C through 37C, wherein the one or more processors are configured to, as part of determining which context model from among the first context model and the second context model to use to determine the context increment for the syntax element, based on at least one of the following conditions being satisfied, make a determination to use the first context model to derive the context increment for the syntax element: i) the color format of the picture being a monochrome color format or a 4:4:4 color format, ii) the color format of the picture being a 4:2:0 color format or a 4:2:2 color format and the color component being a luma component; or iii) the color format of the picture being a 4:2:2 color format and the color component not being the luma component, and the syntax element indicating the prefix of the y coordinate of the last significant transform coefficient of the color component of the block.

Aspect 39C: The device of any of aspects 30C through 38C, wherein the device comprises one or more of a camera, a computer, a mobile device, a broadcast receiver device, or a set-top box.

Aspect 40C: A device for decoding video data includes means for determining, based on a color format of a picture of the video data, which context model from among a first context model and a second context model to use to determine a context increment for a syntax element that indicates a prefix of an x or y coordinate of a last significant transform coefficient of a color component of a block of the picture; and means for decoding a bin of the syntax element by applying Context Adaptive Binary Arithmetic Coding (CABAC) using a context determined based on the context increment for the syntax element.

Aspect 41C: A device for encoding video data includes means for determining, based on a color format of a picture of the video data, which context model from among a first context model and a second context model to use to determine a context increment for a syntax element that indicates a prefix of an x or y coordinate of a last significant transform coefficient of a color component of a block of the picture; and means for encoding a bin of the syntax element by applying Context Adaptive Binary Arithmetic Coding (CABAC) using a context determined based on the context increment for the syntax element.

Aspect 42C: A computer-readable storage medium having stored thereon instructions that, when executed, cause one or more processors to: determine, based on a color format of a picture of video data, which context model from among a first context model and a second context model to use to determine a context increment for a syntax element that indicates a prefix of an x or y coordinate of a last significant transform coefficient of a color component of a block of the picture; and decode a bin of the syntax element by applying Context Adaptive Binary Arithmetic Coding (CABAC) using a context determined based on the context increment for the syntax element.

Aspect 43C: A computer-readable storage medium having stored thereon instructions that, when executed, cause one or more processors to: determine, based on a color format of a picture of video data, which context model from among a first context model and a second context model to use to determine a context increment for a syntax element that indicates a prefix of an x or y coordinate of a last significant transform coefficient of a color component of a block of the picture; and encode a bin of the syntax element by applying Context Adaptive Binary Arithmetic Coding (CABAC) using a context determined based on the context increment for the syntax element.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining, based on which color format, among 4:2:0 and 4:2:2, is a color format of a picture of the video data, which context model from among a first context model and a second context model to use, and making a determination to use:
   (a) the first context model to determine a first context increment for a first syntax element that indicates a prefix of an x or y coordinate of a last significant transform coefficient of a first color component of a block of the picture;
   (b) the second context model to determine a second context increment for a second syntax element, wherein the second syntax element indicates a prefix of an x or y coordinate of a last significant transform coefficient of a second color component of the block of the picture, wherein the context increment for the second syntax element comprises:
   (i) setting a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
   (ii) determining the second context increment for the second syntax element as (binIdx>>ctxShift)+ctxOffset, where binIdx is a bin index of the bin of the second syntax element;
   decoding a bin of the first syntax element by applying Context Adaptive Binary Arithmetic Coding (CABAC)

using a context determined based on the first context increment for the first syntax element; and decoding a bin of the second syntax element by applying Context Adaptive Binary Arithmetic Coding (CABAC) using a context determined based on the second context increment for the second syntax element.

2. The method of claim 1, wherein the first color component is a luma component and the second color component is a chroma component.

3. The method of claim 1, wherein making the determination to use the second context model to determine the second context increment for the second syntax element comprises, based on none of the following conditions being satisfied, making the determination to use the second context model to determine the context increment for the second syntax element:

i) the color format of the picture is a monochrome color format or a 4:4:4 color format, and ii) the color format of the picture is the 4:2:0 color format or the 4:2:2 color format and the second color component is a luma component.

4. The method of claim 3, wherein making the determination to use the second context model to determine the second context increment for the second syntax element is further based on the following condition not being satisfied:

iii) the color format of the picture being the 4:2:2 color format, the second color component being a chroma component, and the second syntax element indicating the prefix of the y coordinate of the last significant transform coefficient of the second color component of the block.

5. The method of claim 1, wherein using the first context model to determine the first context increment for the first syntax element comprises:

performing one of:

based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or based on the log base-2 value of the transform size being greater than or equal to 6, setting the context offset ctxOffset for the first syntax element to 3*(log 2TrafoSize−2)+((log 2TrafoSize−1)>>2)+((1<<log 2TrafoSize)>>6)<<1)+((1<<log 2TrafoSize)>>7) and setting the context shift ctxShift for the first syntax element equal to ((log 2TrafoSize+1)>>2)<<1; and determining the first context increment for the first syntax element as (binIdx>>ctxShift)+ctxOffset, where binIdx is a bin index of the bin of the first syntax element.

6. A method of encoding video data, the method comprising:

determining, based on which color format, among 4:2:0 and 4:2:2, is a color format of a picture of the video data, which context model from among a first context model and a second context model to use, and making a determination, based on the color format, to use:

(a) the first context model to determine a first context increment for a first syntax element that indicates a prefix of an x or y coordinate of a last significant transform coefficient of a first color component of a block of the picture;

(b) the second context model to determine a second context increment for a second syntax element, wherein the second syntax element indicates a prefix of an x or y coordinate of a last significant transform coefficient of a second color component of the block of the picture, wherein the second increment for the second syntax element comprises:

(i) setting a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and (ii) determining the second context increment for the second syntax element as (binIdx>>ctxShift)+ctxOffset, where binIdx is a bin index of the bin of the second syntax element;

encoding a bin of the first syntax element by applying Context Adaptive Binary Arithmetic Coding (CABAC) using a context determined based on the first context increment for the first syntax element; and encoding a bin of the second syntax element by applying Context Adaptive Binary Arithmetic Coding (CABAC) using a context determined based on the second context increment for the second syntax element.

7. The method of claim 6, wherein the first color component is a luma component and the second color component is a chroma component.

8. The method of claim 6, wherein making the determination to use the second context model to determine the second context increment for the second syntax element comprises, based on none of the following conditions being satisfied, making the determination to use the second context model to determine the second context increment for the second syntax element:

i) the color format of the picture is a monochrome color format or a 4:4:4 color format, and ii) the color format of the picture is the 4:2:0 color format or the 4:2:2 color format and the second color component is a luma component.

9. The method of claim 6, wherein making the determination to use the second context model to determine the second context increment for the second syntax element further based on the following condition not being satisfied:

iii) the color format of the picture being the 4:2:2 color format, the second color component being a chroma component, and the second syntax element indicating the prefix of the y coordinate of the last significant transform coefficient of the second color component of the block.

10. The method of claim 6, wherein using the first context model to determine the first context increment for the first syntax element comprises:

performing one of:

based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or based on the log base-2 value of the transform size being greater than or equal to 6, setting the context offset ctxOffset for the first syntax element to 3*(log 2TrafoSize−2)+((log 2TrafoSize−1)>>2)+((1<<log 2TrafoSize)>>6)<<1)+((1<<log 2TrafoSize)>>7)

and setting the context shift ctxShift for the first syntax element equal to ((log 2TrafoSize+1)>>2)<<1; and determining the first context increment for the first syntax element as (binIdx>>ctxShift)+ctxOffset, where binIdx is a bin index of the bin of the first syntax element.

11. A device for decoding video data, the device comprising:
one or more processors coupled to the memory, the one or more processors implemented in circuitry and configured to:
determine, based on which color format, among 4:2:0 and 4:2:2, is a color format of a picture of the video data, which context model from among a first context model and a second context model-to use, and make a determination, based on the color format, to use:
(a) the first context model to determine a first context increment for a first syntax element that indicates a prefix of an x or y coordinate of a last significant transform coefficient of a first color component of a block of the picture;
(b) the second context model to determine a second context increment for a second syntax element, wherein the second syntax element indicates a prefix of an x or y coordinate of a last significant transform coefficient of a second color component of the block of the picture, wherein the second context increment for the second syntax element includes:
(i) set a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
(ii) determine the context increment for the second syntax element as (binIdx>>ctxShift)+ctxOffset, where binIdx is a bin index of the bin of the second syntax element;
decode a bin of the first syntax element by applying Context Adaptive Binary Arithmetic Coding (CABAC) using a context determined based on the first context increment for the first syntax element; and
decode a bin of the second syntax element by applying Context Adaptive Binary Arithmetic Coding (CABAC) using a context determined based on the second context increment for the second syntax element.

12. The device of claim 11, wherein the first color component is a luma component and the second color component is a chroma component.

13. The device of claim 11, wherein the one or more processors are configured to make the determination to use the second context model to determine the second context increment for the second syntax element based on none of the following conditions being satisfied:
i) the color format of the picture is a monochrome color format or a 4:4:4 color format, and
ii) the color format of the picture is the 4:2:0 color format or the 4:2:2 color format and the second color component is a luma component.

14. The device of claim 13, wherein the one or more processors are configured to make the determination to use the second context model to determine the second context increment for the second syntax element based on the following condition not being satisfied: iii) the color format of the picture being the 4:2:2 color format, the second color component being a chroma component, and the second syntax element indicating the prefix of the y coordinate of the last significant transform coefficient of the second color component of the block.

15. The device of claim 11, wherein the one or more processors are configured to, as part of using the first context model to determine the first context increment for the first syntax element:
perform one of:
based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or
based on the log base-2 value of the transform size being greater than or equal to 6, setting the context offset ctxOffset for the first syntax element to 3*(log 2TrafoSize−2)+((log 2TrafoSize−1)>>2)+((1<<log 2TrafoSize)>>6)<<1)+((1<<log 2TrafoSize)>>7) and setting the context shift ctxShift for the first syntax element equal to ((log 2TrafoSize+1)>>2)<<1; and
determine the first context increment for the first syntax element as (binIdx>>ctxShift)+ctxOffset, where binIdx is a bin index of the bin of the first syntax element.

16. The device of claim 11, further comprising a display configured to display decoded video data.

17. The device of claim 11, wherein the device comprises one or more of a camera, a computer, a mobile device, a broadcast receiver device, or a set-top box.

18. A device for encoding video data, the device comprising:
a memory configured to store the video data; and
one or more processors coupled to the memory, the one or more processors implemented in circuitry and configured to:
determine, based on which color format, among 4:2:0 and 4:2:2, is a color format of a picture of the video data, which context model from among a first context model and a second context model-to use, and make a determination, based on the color format, to use:
(a) the first context model to determine a first context increment for a first syntax element that indicates a prefix of an x or y coordinate of a last significant transform coefficient of a first color component of a block of the picture;
(b) the second context model to determine a second context increment for a second syntax element, wherein the second syntax element indicates a prefix of an x or y coordinate of a last significant transform coefficient of a second color component of the block of the picture, wherein the second context increment for the second syntax element comprises:
(i) set a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
(ii) determine the context increment for the second syntax element as (binIdx>>ctxShift)+ctxOffset, where binIdx is a bin index of the bin of the second syntax element;

encode a bin of the first syntax element by applying Context Adaptive Binary Arithmetic Coding (CABAC) using a context determined based on the first context increment for the first syntax element; and encode a bin of the second syntax element by applying Context Adaptive Binary Arithmetic Coding (CABAC) using a context determined based on the second context increment for the second syntax element.

19. The device of claim 18, wherein the first color component is a luma component and the second color component is a chroma component.

20. The device of claim 18, wherein the one or more processors are configured to make the determination to use the second context model to determine the second context increment for the second syntax element comprises, based on none of the following conditions being satisfied:
i) the color format of the picture is a monochrome color format or a 4:4:4 color format, and
ii) the color format of the picture is the 4:2:0 color format or the 4:2:2 color format and the second color component is a luma component.

21. The device of claim 20, wherein the one or more processors are configured to make the determination to use the second context model to determine the second context increment for the second syntax element based on the following condition not being satisfied: iii) the color format of the picture being the 4:2:2 color format, the second color component being a chroma component, and the second syntax element indicating the prefix of the y coordinate of the last significant transform coefficient of the second color component of the block.

22. The device of claim 18, wherein the one or more processors are configured to, as part of using the first context model to determine the first context increment for the first syntax element:
perform one of:
based on a log base-2 value of a transform size of the block being less than 6, setting a context offset ctxOffset for the first syntax element to 3*(log 2TrafoSize−2)+((log 2TrafoSize−1)>>2) and setting a context shift ctxShift for the first syntax element equal to (log 2TrafoSize+1)>>2, where log 2TrafoSize indicates the log base-2 value of the transform size, or
based on the log base-2 value of the transform size being greater than or equal to 6, setting the context offset ctxOffset for the first syntax element to 3*(log 2TrafoSize−2)+((log 2TrafoSize−1)>>2)+((1<<log 2TrafoSize)>>6)<<1)+((1<<log 2TrafoSize)>>7) and setting the context shift ctxShift for the first syntax element equal to ((log 2TrafoSize+1)>>2)<<1; and
determine the first context increment for the first syntax element as (binIdx>>ctxShift)+ctxOffset, where binIdx is a bin index of the bin of the first syntax element.

23. The device of claim 18, wherein the device comprises one or more of a camera, a computer, a mobile device, a broadcast receiver device, or a set-top box.

24. A device for decoding video data, the device comprising:
means for determining, based on which color format, among 4:2:0 and 4:2:2, is a color format of a picture of the video data, which context model from among a first context model and a second context model to use, and making a determination, based on the color format, to use:
(a) the first context model to determine a first context increment for a first syntax element that indicates a prefix of an x or y coordinate of a last significant transform coefficient of a first color component of a block of the picture;
(b) the second context model to determine a second context increment for a second syntax element, wherein the second syntax element indicates a prefix of an x or y coordinate of a last significant transform coefficient of a second color component of the block of the picture, wherein the context increment for the second syntax element comprises:
(i) setting a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
(ii) determining the second context increment for the second syntax element as (binIdx>>ctxShift)+ctxOffset, where binIdx is a bin index of the bin of the second syntax element;
means for decoding a bin of the first syntax element by applying Context Adaptive Binary Arithmetic Coding (CABAC) using a context determined based on the first context increment for the-first syntax element; and
means for decoding a bin of the second syntax element by applying Context Adaptive Binary Arithmetic Coding (CABAC) using a context determined based on the second context increment for the second syntax element.

25. A device for encoding video data, the device comprising:
means for determining, based on which color format, among 4:2:0 and 4:2:2, is a color format of a picture of the video data, which context model from among a first context model and a second context model to use, and making a determination, based on the color format, to use:
(a) the first context model to determine a first context increment for a first syntax element that indicates a prefix of an x or y coordinate of a last significant transform coefficient of a first color component of a block of the picture;
(b) the second context model to determine a second context increment for a second syntax element, wherein the second syntax element indicates a prefix of an x or y coordinate of a last significant transform coefficient of a second color component of the block of the picture, wherein the context increment for the second syntax element comprises:
(i) setting a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
(ii) determining the second context increment for the second syntax element as (binIdx>>ctxShift)+ctxOffset, where binIdx is a bin index of the bin of the second syntax element;

means for encoding a bin of the first syntax element by applying Context Adaptive Binary Arithmetic Coding (CABAC) using a context determined based on the first context increment for the-first syntax element; and means for encoding a bin of the second syntax element by applying Context Adaptive Binary Arithmetic Coding (CABAC) using a context determined based on the second context increment for the second syntax element.

26. A non-transitory computer-readable storage medium having stored thereon instructions that, when executed, cause one or more processors to:

determine, based on which color format, among 4:2:0 and 4:2:2, is a color format of a picture of the video data, which context model from among a first context model and a second context model-to use, and make a determination, based on the color format, to use:
  (a) the first context model to determine a first context increment for a first syntax element that indicates a prefix of an x or y coordinate of a last significant transform coefficient of a first color component of a block of the picture;
  (b) the second context model to determine a second context increment for a second syntax element, wherein the second syntax element indicates a prefix of an x or y coordinate of a last significant transform coefficient of a second color component of the block of the picture, wherein the second context increment for the second syntax element comprises:
    (i) set a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
    (ii) determine the context increment for the second syntax element as (binIdx>>ctxShift)+ctxOffset, where binIdx is a bin index of the bin of the second syntax element;

decode a bin of the first syntax element by applying Context Adaptive Binary Arithmetic Coding (CABAC) using a context determined based on the first context increment for the first syntax element; and decode a bin of the second syntax element by applying Context Adaptive Binary Arithmetic Coding (CABAC) using a context determined based on the second context increment for the second syntax element.

27. A non-transitory computer-readable storage medium having stored thereon instructions that, when executed, cause one or more processors to:

determine, based on which color format, among 4:2:0 and 4:2:2, is a color format of a picture of the video data, which context model from among a first context model and a second context model-to use, and make a determination, based on the color format, to use:
  (a) the first context model to determine a first context increment for a first syntax element that indicates a prefix of an x or y coordinate of a last significant transform coefficient of a first color component of a block of the picture;
  (b) the second context model to determine a second context increment for a second syntax element, wherein the second syntax element indicates a prefix of an x or y coordinate of a last significant transform coefficient of a second color component of the block of the picture, wherein the second context increment for the second syntax element comprises:
    (i) set a context offset ctxOffset for the second syntax element to 18 and setting a context shift ctxShift for the second syntax element to Max(0, log 2TrafoSize−2)−Max(0, log 2TrafoSize−4), where Max indicates a maximum function and log 2TrafoSize indicates a log base-2 value of a transform size of the block; and
    (ii) determine the context increment for the second syntax element as (binIdx>>ctxShift)+ctxOffset, where binIdx is a bin index of the bin of the second syntax element;

encode a bin of the first syntax element by applying Context Adaptive Binary Arithmetic Coding (CABAC) using a context determined based on the first context increment for the first syntax element; and encode a bin of the second syntax element by applying Context Adaptive Binary Arithmetic Coding (CABAC) using a context determined based on the second context increment for the second syntax element.

* * * * *